(12) United States Patent
Hiragaki

(10) Patent No.: US 6,957,519 B2
(45) Date of Patent: Oct. 25, 2005

(54) CONSTRUCT FOR BUILDINGS AND A METHOD FOR MANUFACTURING THE SAME

(76) Inventor: Minoru Hiragaki, 5-11 Shimizushimono-cho, Shizuoka (JP)

( * ) Notice: Subject to any disclaimer, the term of this patent is extended or adjusted under 35 U.S.C. 154(b) by 94 days.

(21) Appl. No.: 10/665,490

(22) Filed: Sep. 22, 2003

(65) Prior Publication Data

US 2005/0072106 A1   Apr. 7, 2005

(30) Foreign Application Priority Data

Oct. 29, 2002   (JP) .............................. 2002-314296

(51) Int. Cl.⁷ .............................................. E04B 1/58
(52) U.S. Cl. .................. 52/733.2; 52/737.1; 52/731.1; 52/731.2
(58) Field of Search ............................ 52/733.2, 737.1, 52/737.2, 737.6, 167.1, 731.1, 731.2, 732.1, 52/223.8; 29/716

(56) References Cited

U.S. PATENT DOCUMENTS

| | | | | |
|---|---|---|---|---|
| 1,939,598 A | * | 12/1933 | Ragsdale | 52/650.1 |
| 3,490,190 A | * | 1/1970 | See | 52/732.2 |
| 3,694,990 A | * | 10/1972 | Pamer | 52/731.2 |
| 3,858,374 A | * | 1/1975 | Ben-Zvi | 52/223.8 |
| 3,989,396 A | * | 11/1976 | Matsumoto et al. | 403/174 |
| 5,555,695 A | * | 9/1996 | Patsy, Jr. | 52/730.4 |

FOREIGN PATENT DOCUMENTS

| | | |
|---|---|---|
| JP | 49-118512 | 10/1974 |
| JP | 51-40111 | 3/1976 |
| JP | 3-176526 | 7/1991 |
| JP | 3-228938 | 10/1991 |
| JP | 4-285232 | 10/1992 |
| JP | 5-51999 | 3/1993 |
| JP | 11-93259 | 4/1999 |
| JP | 2002-146921 | 5/2002 |

* cited by examiner

Primary Examiner—Basil Katcheves
(74) Attorney, Agent, or Firm—Manabu Kanesaka

(57) ABSTRACT

A construct for buildings includes a steel pipe member and reinforcing elements provided in a hollow portion of the interior of the steel pipe member to cross the interior of the steel pipe member in the longitudinal direction. Inserting holes for the reinforcing elements are formed at mounting positions for the reinforcing elements on an outer peripheral portion of the steel pipe member. These inserting holes are successively formed from the outer peripheral surface of the steel pipe member to the interior thereof. The reinforcing elements are inserted from these inserting holes from the outer peripheral surface of the steel pipe member to the interior orthogonal to the longitudinal direction of the steel pipe member. The steel pipe member and the reinforcing elements are welded and joined.

8 Claims, 18 Drawing Sheets (a)

(a)

(b)

(a)

(b)

CONSTRUCT FOR BUILDINGS AND A METHOD FOR MANUFACTURING THE SAME

BACKGROUND OF THE INVENTION

1. Field of the Invention

The present invention relates to a construct for buildings and a method for manufacturing the same exhibiting favorable workability through a simple structure and capable of achieving high strength and accuracy in structural steelworks constructed through constructs for buildings such as pillar elements or beam elements.

2. Description of the Prior Art

It is conventionally known for a steel pipe structure in which diaphragms are inserted into the interior of steel pipes for reinforcing the steel pipes through the diaphragms (see, for instance, Japanese Patent Laid-Open Publication No. 2002-146921).

Since this technique is a method for inserting diaphragms into steel pipe interiors from small sized openings of the steel pipes, accurately inserting the diaphragms into the steel pipe interiors was quite difficult and the workability was remarkably poor.

On the other hand, once the diaphragms were inserted into the steel pipe interiors, posture of the diaphragms could not be easily corrected when the postures of the diaphragms were not in correct conditions, namely, in which they are orthogonal to length directions of the steel pipes.

SUMMARY OF THE INVENTION

The present invention has been made for solving the above problems, and it is an object thereof to provide a construct for buildings and a method for manufacturing the same with which a structural steelwork that is constructed by the constructs for buildings such as pillar elements and beam elements exhibits favorable workability through a simple structure and capable of achieving high strength and accuracy, the construct for buildings being arranged to comprise a steel pipe member and reinforcing elements provided in a hollow portion of the interior of the steel pipe member to cross the interior of the steel pipe member in the longitudinal direction with the steel pipe member and the reinforcing elements being welded and joined, wherein the steel pipe member is formed with inserting holes for the reinforcing elements on the outer peripheral portion of the steel pipe member formed at mounting positions for the reinforcing elements to be of a width that meets a width dimension of the reinforcing elements, wherein the inserting holes are provided to be successive from the outer peripheral surface of the steel pipe member to the interior, wherein the reinforcing elements are inserted into the inserting holes from the outer peripheral surface of the steel pipe member towards a direction facing the interior of the steel pipe member in a direction that is substantially orthogonal to the longitudinal direction of the steel pipe member.

For achieving the above object, the means of the present invention is arranged to be as a construct for buildings comprising an elongated steel pipe member with a hollow interior and reinforcing elements provided in a hollow portion of the interior of the steel pipe member to cross the interior of the steel pipe member in the longitudinal direction, the steel pipe member and the reinforcing elements being welded and joined together at a plurality of joint holes piercingly formed on an outer peripheral portion of the steel pipe member, wherein the steel pipe member is formed with inserting holes for the reinforcing elements on the outer peripheral portion of the steel pipe member formed at mounting positions for the reinforcing elements to be of a width that meets a width dimension of the reinforcing elements, wherein these inserting holes are provided to be successive from the outer peripheral surface of the steel pipe member to the interior, wherein the reinforcing elements are inserted into the inserting holes from the outer peripheral surface of the steel pipe member towards a direction facing the interior of the steel pipe member in a direction that is substantially orthogonal to the longitudinal direction of the steel pipe member, wherein the reinforcing elements are formed to be plate-like; to have side surfaces that are smaller than cross sections crossing the hollow portion in the interior of the steel pipe member, and to have an outer peripheral surface that is substantially orthogonal to the side surfaces and that corresponds to an inner wall surface of the steel pipe member, wherein engaging elements for engaging with a suspending means are provided on one side portion of the peripheral surface, wherein the engaging elements of the reinforcing elements are provided to be parallel to the longitudinal direction of the outer peripheral surface of the reinforcing elements, wherein engaging members for engaging the engaging elements of the suspending means are respectively provided on both side portions in the longitudinal direction, wherein the engaging members comprise sloped surfaces that arise from above the outer peripheral surfaces of the reinforcing elements and that respectively become broader in both outer directions in the longitudinal direction of the outer peripheral surfaces of the reinforcing elements, and wherein a shape that sections in a direction orthogonal to the longitudinal direction of the reinforcing elements is formed on an upper portion of the engaging elements to be triangular, arc-like or quadrangular.

Alternatively, it is arranged as a construct for buildings comprising an elongated steel pipe member with a hollow interior and reinforcing elements provided in a hollow portion of the interior of the steel pipe member to cross the interior of the steel pipe member in the longitudinal direction, the steel pipe member and the reinforcing elements being welded and joined together at a plurality of joint holes piercingly formed on an outer peripheral portion of the steel pipe member, wherein the steel pipe member is formed with inserting holes for the reinforcing elements on the outer peripheral portion of the steel pipe member formed at mounting positions for the reinforcing elements to be of a width that meets a width dimension of the reinforcing elements, wherein these inserting holes are provided to be successive from the outer peripheral surface of the steel pipe member to the interior, wherein the reinforcing elements are inserted into the inserting holes from the outer peripheral surface of the steel pipe member towards a direction facing the interior of the steel pipe member in a direction that is substantially orthogonal to the longitudinal direction of the steel pipe member, wherein the reinforcing elements are formed to be plate-like, to have side surfaces that are smaller than cross sections crossing the hollow portion in the interior of the steel pipe member, and to have an outer peripheral surface that is substantially orthogonal to the side surfaces and that corresponds to an inner wall surface of the steel pipe member, wherein engaging elements for engaging with a suspending means that suspend the reinforcing elements are provided on one side portion of the outer peripheral surface, wherein projecting members corresponding to the joint holes piercingly formed on the outer peripheral portion of the steel pipe member are formed on the outer peripheral surface of the reinforcing elements on a side opposite to the engaging elements, wherein the engaging elements of the reinforcing elements are provided to be parallel to the longitudinal direction of the outer peripheral surface of the reinforcing elements, wherein engaging members for engaging the engaging elements of the suspending means are respectively provided on both side portions in the longitudinal direction, wherein the engaging members comprise sloped surfaces that arise from above the outer peripheral surfaces of the reinforcing elements and that respectively become broader in both outer directions in the longitudinal direction of the outer peripheral surfaces of the reinforcing elements, and wherein a shape that sections in a direction orthogonal to the longitudinal direction of the reinforcing elements is formed on an upper portion of the engaging elements to be triangular, arc-like or quadrangular.

Still further, it may alternatively be arranged as a construct for buildings comprising an elongated steel pipe member with a hollow interior and reinforcing elements provided in a hollow portion of the interior of the steel pipe member to cross the interior of the steel pipe member in the longitudinal direction, the steel pipe member and the reinforcing elements being welded and joined together at a plurality of joint holes piercingly formed on an outer peripheral portion of the steel pipe member, wherein the steel pipe member is formed with inserting holes for the reinforcing elements on the outer peripheral portion of the steel pipe member formed at mounting positions for the reinforcing elements to be of a width that meets a width dimension of the reinforcing elements, wherein these inserting holes are provided to be successive from the outer peripheral surface of the steel pipe member to the interior, wherein the reinforcing elements are inserted into the inserting holes from the outer peripheral surface of the steel pipe member towards a direction facing the interior of the steel pipe member in a direction that is substantially orthogonal to the longitudinal direction of the steel pipe member, wherein guiding elements are inserted and fitted in to the underneath joint holes piercingly formed on the outer peripheral portion of the steel pipe member, wherein the guiding elements comprise stopping members that abut inner walls of the joint holes and guide members that are prolonged by the stopping members and that jut into a space portion of the steel pipe member, and wherein the guide members comprise sloped surfaces that expand to both sides with respect to a length direction of the steel pipe member with the joint holes being pinched between and along which lower end edge portions of the outer peripheral surfaces of the reinforcing elements may slide.

There are provided a plurality of reinforcing elements in the interior of the steel pipe member at intervals with a reinforcing filler that solidifies after injection being filled into space portions formed between the reinforcing elements.

The steel pipe member provided with reinforcing elements in its interior is either a pillar element erected such that its longitudinal direction becomes a direction vertical to a horizontal surface or a beam element that becomes either horizontal or oblique when mounted to a building.

The steel pipe member provided with reinforcing elements in its interior is a pillar element erected such that its longitudinal direction becomes a direction vertical to a horizontal surface, and wherein connecting members to be joined with end portions of beam elements of a building are welded and joined to welded joint areas at which the steel pipe member and the reinforcing elements are welded and joined.

Alternatively, there is provided a method for manufacturing a construct for buildings, wherein in a construct for buildings comprising an elongated steel pipe member with a hollow interior and reinforcing elements provided in a hollow portion of the interior of the steel pipe member to cross the interior of the steel pipe member in the longitudinal direction, the steel pipe member and the reinforcing elements being welded and joined together at a plurality of joint holes piercingly formed on an outer peripheral portion of the steel pipe member, inserting holes are piercingly formed at mounting positions for the reinforcing elements on the outer peripheral portion of the steel pipe member and the steel pipe member is mounted in a substantially horizontal manner such that the inserting holes face upward, wherein engaging elements piercingly formed on upper portions of the reinforcing elements are suspended by a suspending means above the inserting holes such that outer peripheral portions that comprise width directions of the reinforcing elements face downward, the reinforcing elements being descended into the inserting holes by dropping the same in a vertical manner through the own weight of the reinforcing members and inserted in a direction substantially orthogonal to the longitudinal direction of the steel pipe member from the outer peripheral surface of the steel pipe member towards the interior of the steel pipe member, wherein downside outer peripheral surfaces of the reinforcing elements are supported and received by a lower inner surface of the hollow portion of the steel pipe member such that the outer peripheral surfaces on both side portions of the reinforcing elements correspond to the inner side surface of the hollow portion of the steel pipe member, and wherein the steel pipe member and the outer peripheral portions of the reinforcing elements are welded and joined to become integral at the inserting holes and the plurality of joint holes.

In suspending reinforcing elements through a suspending means, engaging elements for the reinforcing elements are provided to be parallel to the longitudinal direction of outer peripheral surfaces of the reinforcing elements; wherein engaging members for engaging with the suspending means are provided on both side portions of the longitudinal direction; the engaging members comprising sloped surfaces that arise from above the outer peripheral surfaces of the reinforcing elements and that respectively become broader in both outer directions in the longitudinal direction of the outer peripheral surfaces of the reinforcing elements, and wherein a shape that sections in a direction orthogonal to the longitudinal direction of the reinforcing elements is formed on an upper portion of the engaging elements to be triangular, arc-like or quadrangular, projecting members corresponding to joint holes piercingly formed on the outer peripheral portion of the steel pipe member are provided at a lower portion of the engaging elements of the reinforcing elements, the projecting members being formed such that a shape that sections in a direction orthogonal to the longitudinal direction of the reinforcing elements is formed to be triangular, arc-like or quadrangular, when the engaging members of the engaging elements of the reinforcing elements are grasped by the suspending means, the reinforcing elements are lifted upward by their sloped surfaces and wherein the reinforcing are supported and received in vertical conditions with upper portions of the engaging elements engaging with pressing members of the suspending means for receiving compressive load, and when the projecting members of the reinforcing elements are positioned at the joint holes, outside surfaces of the projecting members formed to be triangular, arc-like or quadratic are guided while abutting peripheral edges of the joint holes to be inserted therein while correcting postures of the reinforcing elements in vertical directions.

DESCRIPTION OF THE PREFERRED EMBODIMENTS

Examples for embodying the construct for buildings and the method for manufacturing the same according to the present invention will now be explained on the basis of the drawings.

Figure 1:
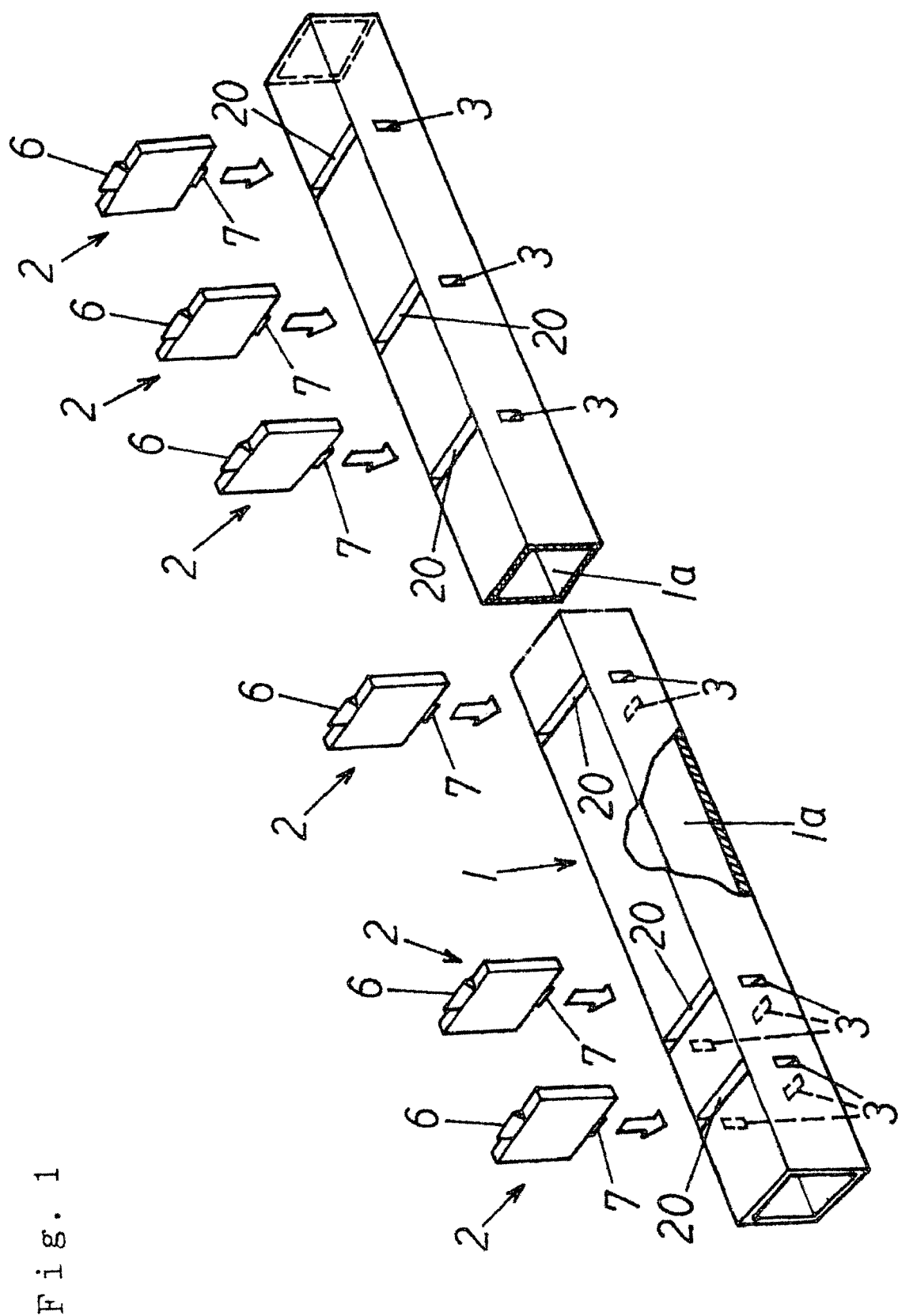
FIG. 1 is a perspective view illustrating the construct for buildings according to the present invention as an exploded and partially cut-off view.
Figure 2:
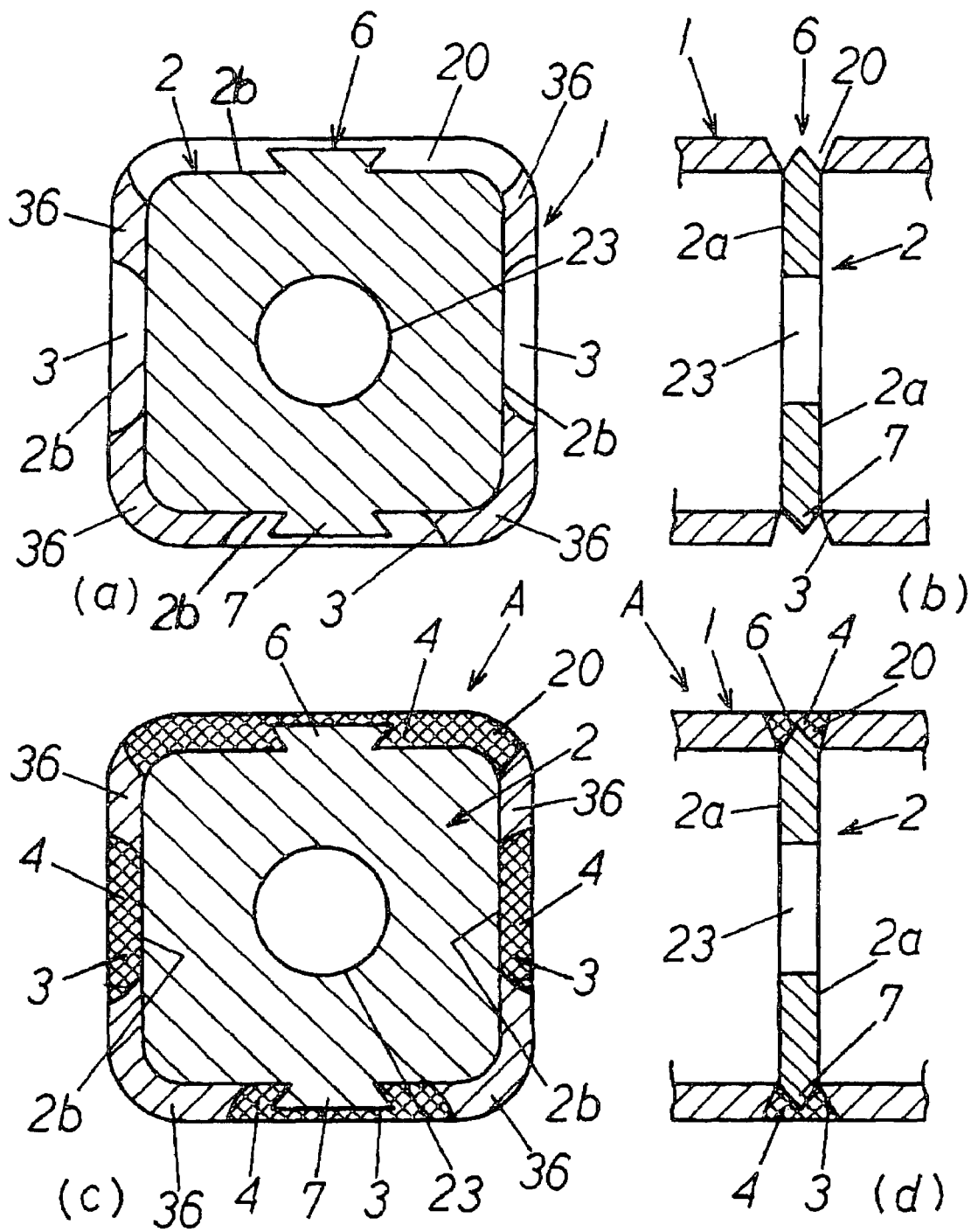
FIG. 2 shows sectional views illustrating the construct for buildings of FIG. 1, wherein (a) and (b) illustrate conditions prior to welding and joining and (c) and (d) illustrate conditions after welding and joining.

In FIGS. 2, 6 to 10, 12 and 14, A denotes a construct for buildings which is employed, for instance, as a pillar element serving as a vertical material or a beam element serving as a horizontal material or a sloped material when constructing a structural steelwork or other buildings. As illustrated in FIG. 1, it comprises an elongated steel pipe member 1 with a hollow interior and reinforcing elements 2 provided in a hollow portion 1a of the interior of the steel pipe member 1 to cross the interior of the steel pipe member 1 in the longitudinal direction, wherein the steel pipe member 1 and the reinforcing elements 2 are fixedly attached through welding and joining 4 at a plurality of joint holes 3 piercingly formed on an outer peripheral portion of the steel pipe member 1.

The above steel pipe member 1 is formed of metal, wherein its interior is successively hollow and of elongated shape, and its section crossing its length direction is formed to be quadratic (square or rectangular) or circular (including an elliptic shape).

There are piercingly formed on the outer peripheral portion of the steel pipe member 1 a plurality of joint holes 3 that pierce through to the hollow portion 1a of the steel pipe member 1; when the section of the steel pipe member 1 is angular, such holes are formed on three directions other than one side surface, and inserting holes 20 as will be described later are formed on the remaining one surface.

It should be noted that the shape of the joint holes 3 might be arbitrarily formed (e.g., circular or angular), and the number of formation is not particularly limited, either.

The above reinforcing elements 2 are formed of metal in a sheet-like manner and are of a dimension approximating an inner peripheral portion of the hollow portion 1a, including side surfaces 2a, 2a, which comprise a front side and a rear side that are smaller than crossing inner surfaces in which the hollow portion 1a in the interior of the steel pipe member 1 is crossed and an outer peripheral surface 2b that is substantially orthogonal to the side surfaces 2a, 2a and that corresponds to an inner wall surface of the steel pipe member 1. When accommodated in the hollow portion 1a of the steel pipe member 1, these elements are disposed so as not to form clearances between the inner wall surface of the steel pipe member 1 and the outer peripheral surfaces 2b of the reinforcing elements 2 that enable movements of the reinforcing elements 2.

An engaging element 6 for engaging with a suspending means 5 that is to be discussed later (an upward projecting member) is formed on one side portion (an upward portion when suspended by the suspending means 5) of the outer peripheral surface 2b of each reinforcing element 2.

Moreover, a projecting member 7 corresponding to one of the joint holes 3 piercing formed on the outer peripheral portion of the steel pipe member 1 is provided on the outer peripheral surface 2b of the reinforcing element 2 on the other side as the engaging element 6 (downward position when suspended by the suspending means 5). The engaging element 6 and the projecting member 7 may be of identical shape.

Figure 3:
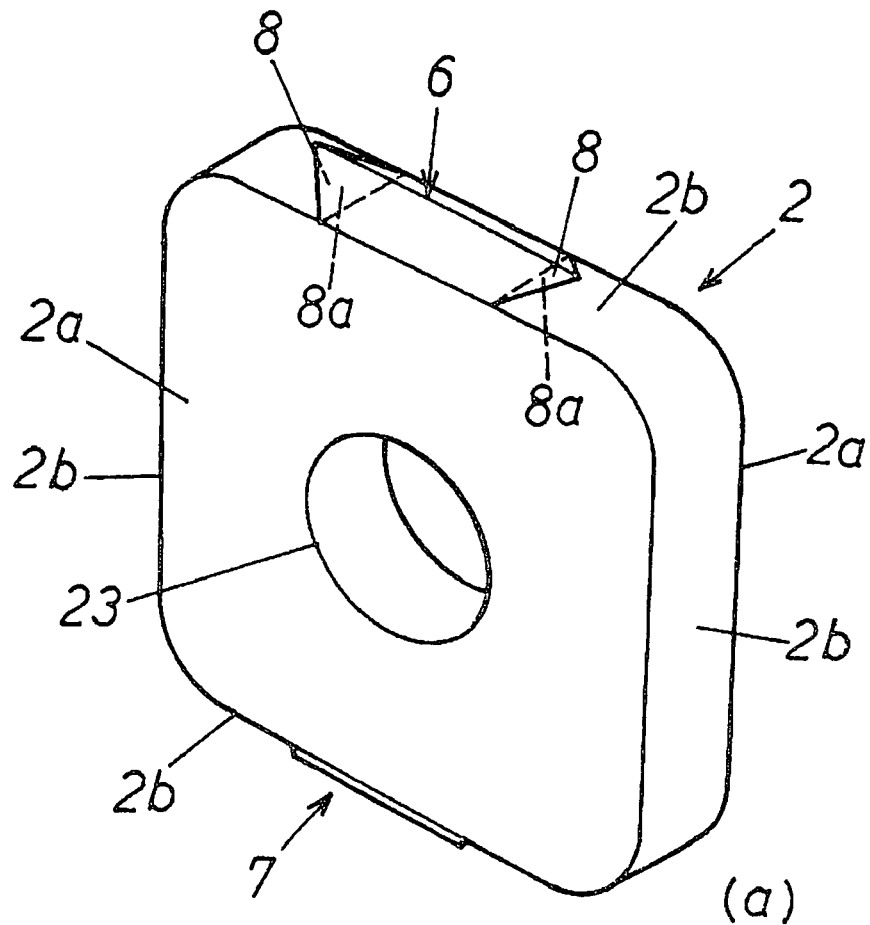
FIG. 3 illustrates reinforcing elements of the construct for buildings of FIG. 1, wherein (a) illustrates a perspective view and (b), (c), (d) and (e) explanatory views respectively showing engaging element portions.
Figure 3:
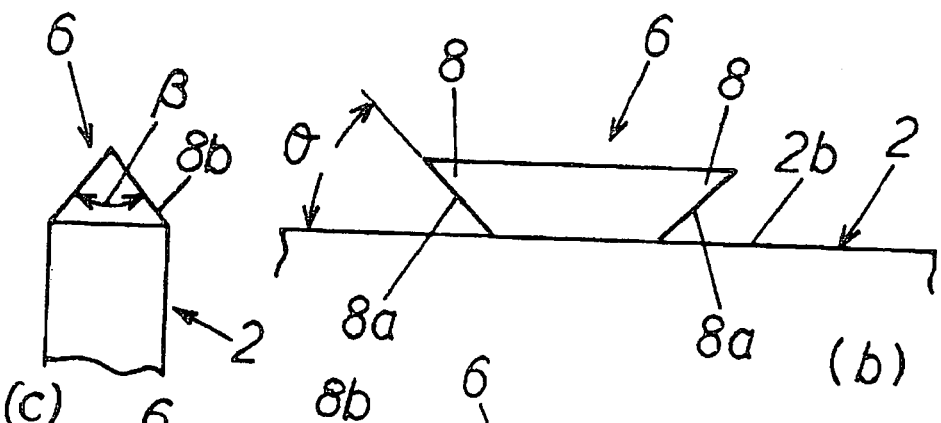

The above engaging element 6 is formed, as illustrated in the respective drawings of FIG. 3, in that it comprises an upper surface that is parallel to a length that is parallel to a longitudinal direction of the outer peripheral surface of the reinforcing element 2 and in that it is located at a central portion in the longitudinal direction, and engaging members 8,8 for engaging with engaging elements 15, 15 of the suspending means 5 are respectively formed on both side portions in the longitudinal direction.

The engaging members 8, 8 include sloped surfaces 8a, 8a that arise from above the outer peripheral surface 2 of the reinforcing element 2 and that respectively become broader in both outer directions in the longitudinal direction of the outer peripheral surface 2b of the reinforcing element 2, and as illustrated in FIG. 3(b), an angle θ of the sloped surfaces 8a, 8a is formed to be approximately 30° to 60°, and preferably 45°.

Moreover, a shape 8b that sections in a direction that is orthogonal to a length direction of the engaging element 6 is formed on the upper portion of the engaging element 6 as to be triangular with its apex facing upward as illustrated in FIG. 3(c), as to be arc-like with its arc surface facing upward as illustrated in FIG. 3(d) or as to be trapezoidal having a top side that is shorter than a bottom side as illustrated in FIG. 3(e) or, though not illustrated, to be rectangular, either cubic or oblong.

Figure 15:
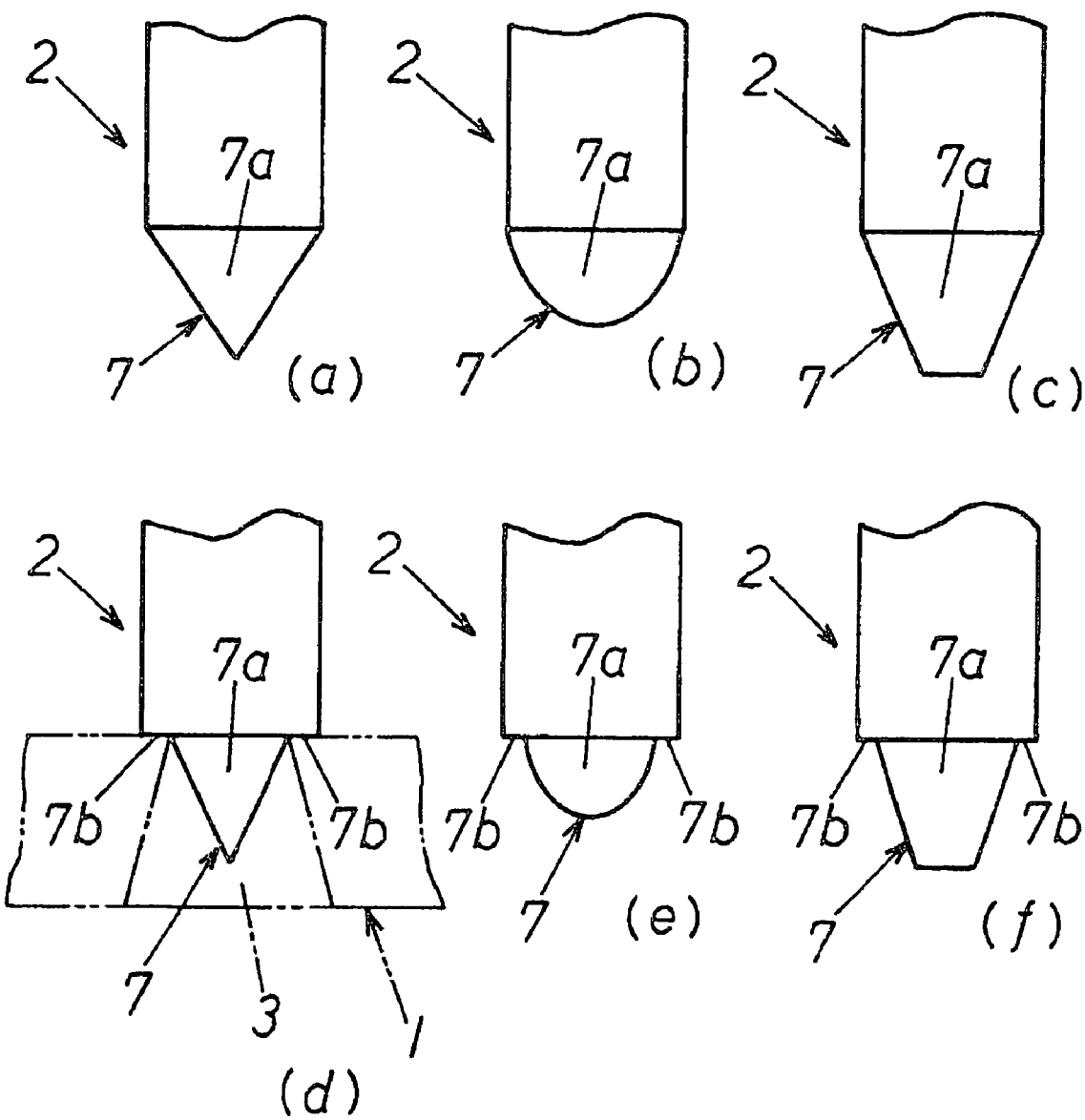
FIG. 15 shows explanatory views, (a)–(f) illustrating respective examples of projecting members of the reinforcing elements employed in the construct for buildings of FIG. 1.

Though not illustrated, a bottom side of the sectional shape 8b may be formed to be shorter than a plate width of the reinforcing element 2 (for reference purposes, thus shaped as the sectional shape 7a of the projecting member 7 as illustrated in FIGS. 15(d), (e) and (f)).

When formed in a triangular shape, the angle β is formed to be approximately 600 to 120°, and preferably 90°.

Figure 4:
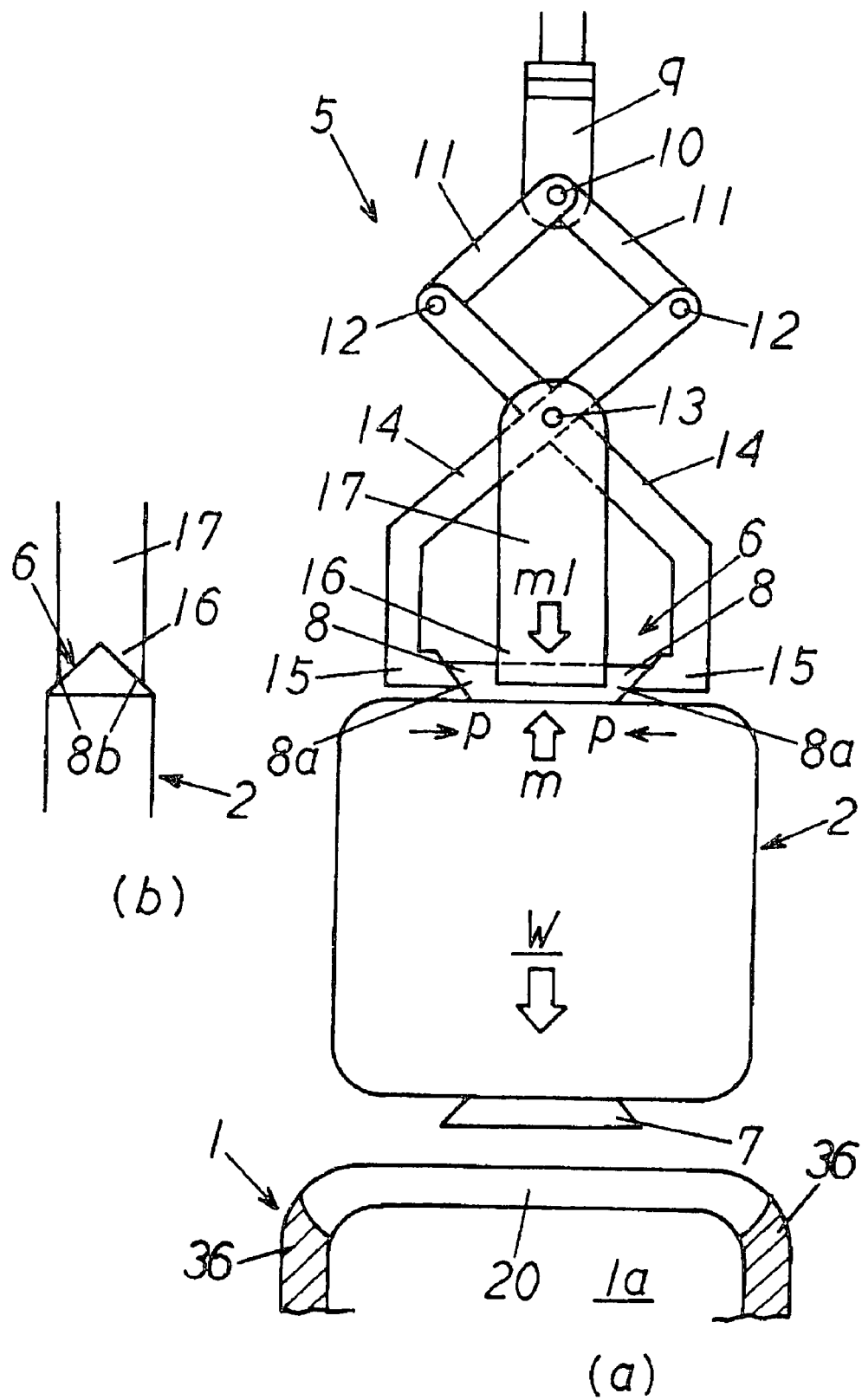
FIG. 4 shows explanatory views, wherein (a) illustrates a suspended condition of the reinforcing elements of the construct for buildings of FIG. 1 and (b) is a part of a reinforcing element.

As illustrated in FIG. 4, the above suspending means 5 is provided with grasping arms 14, 14 that are connected to a pair of links 11, 11, which one end portions are mounted to a lower end portion of a suspending member 9 through a support shaft 10 and which other end portions are connected to support shafts 12, 12, and which intermediate portions are connected through a mounting shaft 13 in a crossed manner, and engaging elements 15, 15 are respectively mounted to lower end portions of the grasping arms 14, 14.

The engaging elements 15, 15 include engaging surfaces that engage with the sloped surfaces 8a, 8a of the engaging members 8, 8 of the engaging element 6.

A pressing element 17, which base portion is mounted to the mounting shaft 13 in a freely rotating manner and which tip end portion is provided with a pressing member 16, is provided in a dropping manner. As illustrated in FIG. 4(b), an inner end surface of the pressing member 16 comprises an inner angle that is substantially identical to that of a shape 8b formed upward of the engaging element 6 so as to be in close contact with this shape 8b.

Figure 13:
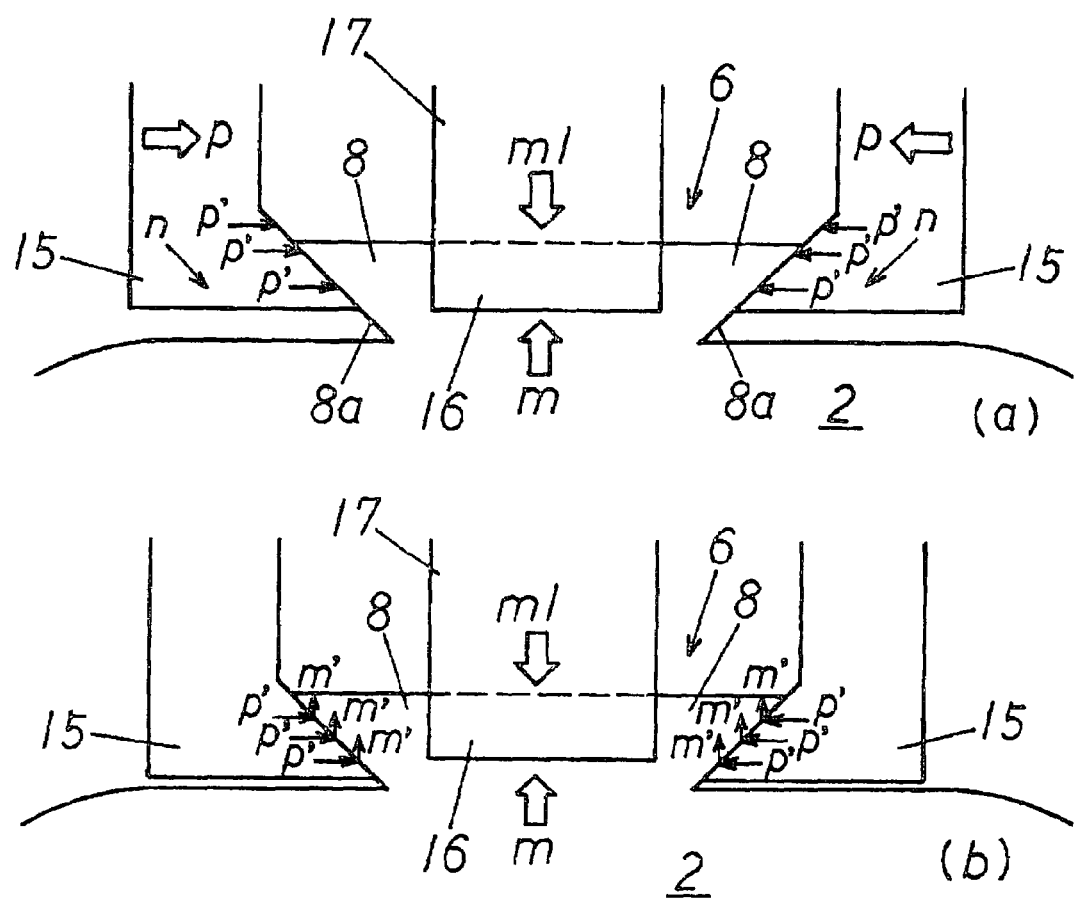
FIG. 13 shows explanatory views, (a) and (b) illustrating conditions of transmitting force when reinforcing elements of the construct for buildings of FIG. 1 are suspended.

Accordingly, as illustrated in FIGS. 4(a) and 13(a), (b), when the engaging members 8, 8 of the engaging member 6 of the reinforcing element 2 are grasped by the engaging elements 15, 15 of the suspending means 5, the grasping forces p, p (p'+p'+p') will act as inwardly clamping forces (direction indicated by arrow n in FIG. 13(a)) on the sloped surfaces 8, 8, respectively.

Through this grasping forces p, p, the engaging elements 15, 15 and the sloped surfaces 8a, 8a will slide to generate a component force m' from the sloped surfaces 8a, 8a whereupon a weight W of the reinforcing element 2 is lifted in a direction of arrow m.

On the other hand, as illustrated in FIGS. 4(a) and (b) and FIGS. 13(a) and (b), pressing force (compression force) in a direction of arrow m1 is generated through the pressing member 16 of the suspending means 5 that restricts movements in vertical directions, and since the upper portion of the engaging element 6 is positioned with respect to the vertical directions, the reinforcing element 2 is continuously maintained in a proper posture by the action of its own weight and also by being corrected in vertical directions with respect to lateral directions and front and rear directions that are orthogonal to the lateral directions.

Since the force applied on the reinforcing element 2 is given as $$(p'+p'+p'\ldots)\times 2=2p=m=(m'+m'+m'\ldots)\times 2=m1=w,$$

all of the grasping force of the engaging elements 15, 15 is converted into force for lifting the reinforcing element 2 in the direction m as indicated by the arrow.

More particularly, since the inner surface of the pressing member 16 is a substantially horizontal surface, the upper portion of the engaging element 6 abutting this inner surface will follow the inner surface of the pressing member 16, and when the upper outer peripheral portion 2b of the reinforcing element 2 suitably comes to a substantially horizontal condition, the entire reinforcing element will accordingly be suspended by the suspending means 5 in a vertical condition.

It should be noted that the above-mentioned one weight of the reinforcing element 2 denotes the weight of the reinforcing element 2 itself and is identical to gravity by which it is pulled towards the ground surface side through gravitational pull.

The projecting member 7 provided at a lower portion of the reinforcing element 2 is arranged in that a shape 7b that sections in a direction orthogonal to the length direction of the reinforcing element 2 is either triangular with its apex facing downward as illustrated in FIGS. 15(a) and (d), as to be arc-like with its arc surface facing downward as illustrated in FIGS. 15(b) and (e) or as to be trapezoidal having a top side (outward side) that is shorter than a bottom side (inward side) as illustrated in FIGS. 15(c) and (f) or, though not illustrated, to be rectangular, either cubic or oblong.

It should be noted that the bottom side (inward side) of the sectional shape 7b may also be formed to be shorter than the plate width of the reinforcing element 2 as illustrated in FIGS. 15(d), (e) and (f) whereby engaging stepped portions 7b, which abut against and engage with outer peripheral edge portions on inner wall sides of the joint holes 3 that are formed at a lower portion of the inner wall of the steel pipe member 1, are formed on both side portions or one side portion of the bottom side (inward side) of a downward peripheral edge portion of the reinforcing element 2.

Figure 5:
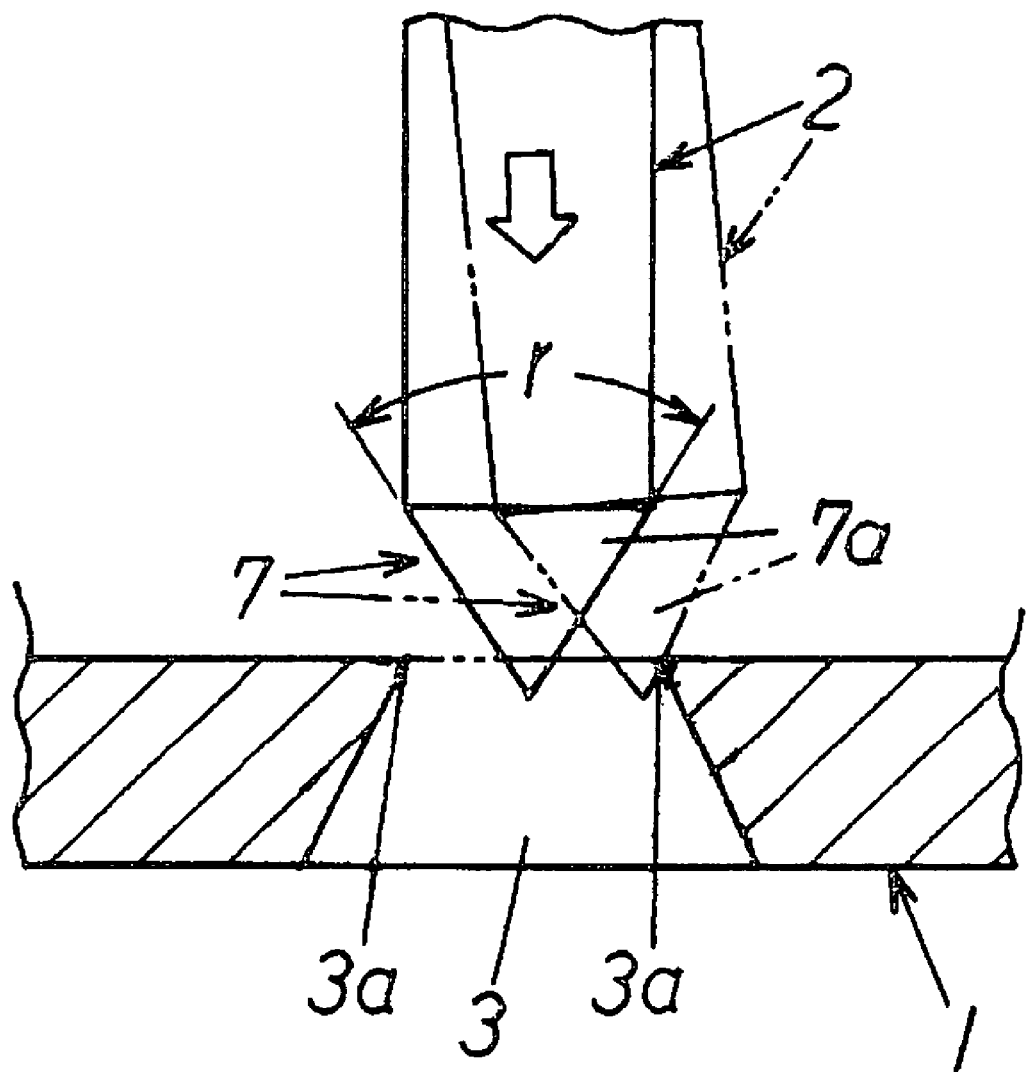
FIG. 5 is an explanatory view illustrating projecting member portions in a condition in which they are inserted into the construct for buildings of FIG. 1.
Figure 6:
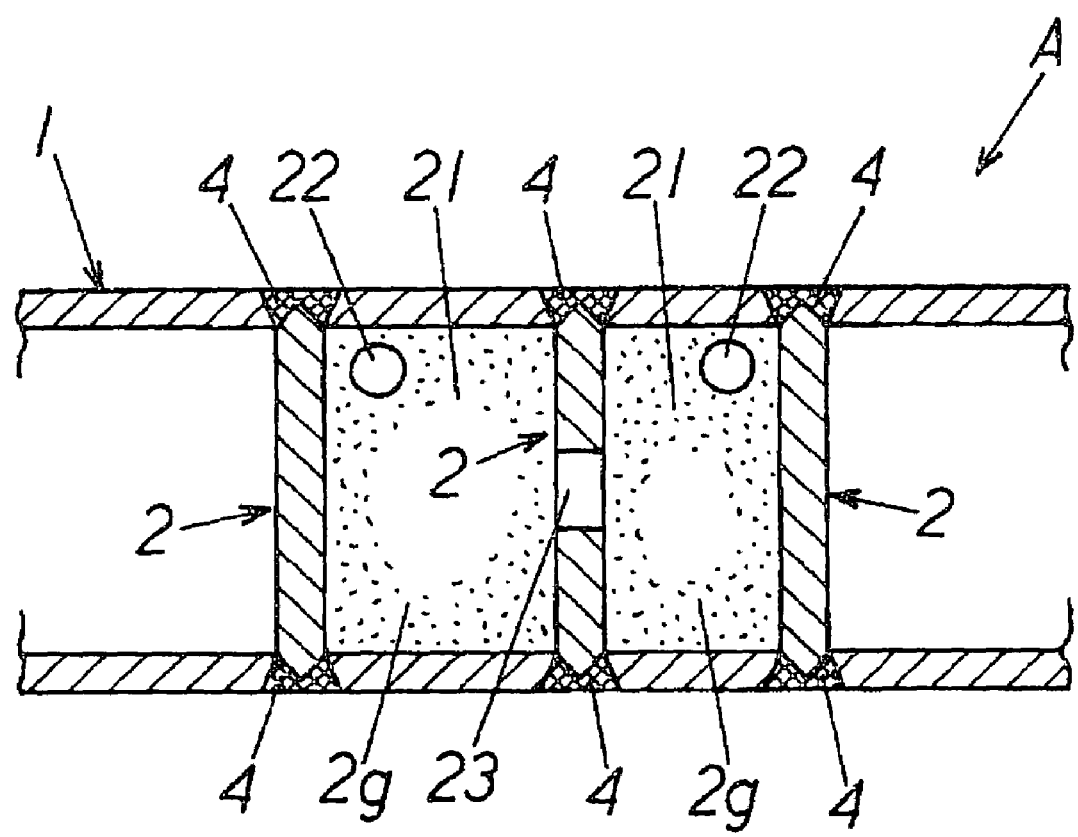
FIG. 6 is a sectional view illustrating a condition in which a reinforcing filler is filled into the interior of the construct for buildings of FIG. 1.

As illustrated in FIG. 5, an angle r of the sectioned shape 7a is formed to be approximately 60° to 120°, and preferably 90°. The projecting member 7 may be arranged to be similar to the engaging element 6 formed at the upper portion of the reinforcing element 2, and the workability at the time of suspension may be improved thereby.

Even if the reinforcing element 2 suspended by the suspending means 5 is not in a condition that properly faces a vertical direction of suspending the reinforcing element 2 as illustrated by the virtual line in FIG. 5 when it is inserted into the hollow portion 1a through an inserting hole 20 of the steel pipe member 1, the sloped surfaces 7 of the projecting member 7 will slide along and be guided by inner peripheral edges 3a of the joint hole 3 so that the projecting member 7 is securely inserted into the joint hole 3 in the gravitational direction, that is, automatically in the vertical direction.

It should be noted that the above inserting holes 20 of the steel pipe member 1 are formed at mounting positions for the reinforcing elements 2 on the outer peripheral portion of the steel pipe member 1 to be of a width that meets a width dimension of the reinforcing elements 2, that is, to be of a width with which the entire reinforcing element 2 may be inserted into the hollow portion 1a of the steel pipe member 1 from the outer peripheral portion of the steel pipe member 1.

The inserting holes 20 are formed to be successive from the outer peripheral surface of the steel pipe member 1 to an inner radial width (hollow portion 1a) of the steel pipe member 1, whereby the reinforcing elements 2 are inserted from the outer peripheral surface of the steel pipe member 1 towards the interior of the steel pipe member 1 in a direction that is substantially orthogonal to the longitudinal direction of the steel pipe member 1.

Since insertion of the reinforcing elements 2 is affected by descending the reinforcing elements 2 suspended by the suspending means 5 from above the steel pipe member 1, the positions for piercingly forming the inserting holes 20 are provided on an upper surface of the steel pipe member 1.

The above steel pipe member 1 and the reinforcing elements 2 undergo welding and joining 4 at a plurality of joint holes 3 piercingly formed on the outer peripheral portion of the steel pipe member 1, wherein the joint holes 3 may be formed to have an inner diameter corresponding to a plate width of the reinforcing elements 2; however, the size of the inner diameter may be suitably selected in view of welding strength with regards to the design, and the shape is not limited to a circular shape but may also be of a long hole shape.

Joint holes 3 provided at intervals and connecting portions 36 with no joint holes 3 being formed thereon co-exist on the entire peripheral portion of the steel pipe member 1 connecting the plurality of joint holes 3, wherein at least at the joint hole 3 portions, the steel pipe member 1 is in a successive condition in which it is not divided in the length direction.

While the welding and joining 4 is formed through welding upon fusing a commonly used hot charge with the steel pipe member 1 and the reinforcing elements 2, it is possible to select an arbitrary way of welding and joining 4 such as crimping/resistance welding using no hot charges or a method in which such crimping/resistance welding and arc welding are concomitantly used as long as it is possible to obtain a specified joint strength.

The construct for buildings A and the method for manufacturing the construct for buildings according to the present embodiment of the invention as arranged in the above-described manner exhibit actions as will be discussed below.

First, a single and successive steel pipe member 1 with a section crossing the longitudinal direction thereof being quadratic and formed to be of specified length is prepared as illustrated in FIG. 1, joint holes 3, 3, 3 are piercingly formed on three surfaces of the outer peripheral surface thereof or on anyone of them at one or a plurality of spots at portions of the steel pipe member 1 for fixedly attaching the reinforcing elements 2 (either one or a plurality of spots).

The inserting holes 20 corresponding to the internal dimension of the hollow portion 1a of the steel pipe member 1 are then piercingly formed on the remaining one surface other than the three surfaces of the steel pipe member 1 such that they are formed on the same annular positions (same sectional positions that cross the longitudinal direction of the steel pipe member 1) as the joint holes 3, 3, 3.

When the steel pipe member 1 is then laid in a substantially horizontal manner onto a support table (not shown) and the engaging members 8, 8 of the engaging elements 6 of the reinforcing elements 2 are grasped by the engaging elements 15, 15 of the suspending means 5 connected to a hoist or a crane, the grasping forces p, p are inwardly applied to the respective sloped surfaces 8a, 8a.

Through these grasping forces p, p, the engaging elements 15, 15 and the sloped surfaces 8a, 8a are slid for lifting the reinforcing elements 2 in the direction of arrow m. On the other hand, the upper portion of the engaging elements 6 are pressed by the pressing members 16 of the suspending means 5 and are positioned while receiving compressive load as illustrated in FIGS. 4(a) and (b) so that the reinforcing elements 2 are oriented in vertical directions through the action of the own weight and the action of gravity and are continuously maintained in proper postures in that they are corrected in vertical directions with respect to lateral directions and front and rear directions that are orthogonal to the lateral directions.

In this condition, the reinforcing elements 2 suspended by the suspending means 5 are descended, straightly inserted into inserting holes 20 piercingly formed on the upper portion of the steel pipe member 1 to enter the hollow portion 1a of the steel pipe member 1, and the reinforcing elements 2 are then accommodated in the hollow portion 1a as illustrated in FIGS. 2(a) and (b).

When the reinforcing elements 2 are inserted into the hollow portion 1a through the inserting holes 20 of the steel pipe member 1 and they come to an oblique condition in which they do not face properly in the vertical direction in the suspended condition as illustrated in FIG. 5, the sloped surfaces of the projecting members 7 will be guided while sliding along the inner peripheral edges 3a of the joint holes 3 in the course of descending the reinforcing elements 2, and the oblique posture of the reinforcing elements 2 will be automatically corrected through gravity as illustrated by the virtual lines in the same drawings so that the projecting members 7 are inserted into the joint holes 3 in proper vertical conditions.

Since the downside outer peripheral surfaces 2b of the reinforcing elements 2 are supported and received by the lower inner surface of the hollow portion 1a of the steel pipe member 1, the outer peripheral surfaces 2b, 2b on both side portions will correspond to the inward surface of the hollow portion 1a of the steel pipe member 1 to be stably held in this condition.

Then, by performing welding and joining 4 between the joint holes 3,3 of the steel pipe member 1 and both side peripheral portions 2b of the reinforcing elements 2, between the joint holes 3 and the lower outer peripheral portions 2b of the reinforcing elements 2, between the projecting members 7 and the inserting holes 20 and between upper outer peripheral portions 2b of the reinforcing elements 2 and the engaging elements 6 as illustrated in FIGS. 2(c) and (d), the construct A for buildings is manufactured.

Such a construct A for buildings exhibits high strength when employed as a pillar element or a beam element in structural steelworks.

When a plurality of reinforcing elements 2 are inserted into the hollow portion 1a of the steel pipe member 1 at intervals in the construct A for buildings, the construct A for buildings may be further reinforced by filing a reinforcing filler 21 into space portions 2g formed by these reinforcing elements 2, 2 . . . .

A material causing no volumetric limitations after solidification or upon application of load is employed as the reinforcing filler 21, and it is possible to employ, among others, general concrete, mortar-like materials or incombustible curing materials substituting such compositions. For filling into space portions 2g of the reinforcing elements 2, a preferable condition is one in which it exhibits favorable flowability, and the filler shall be prepared to be in, for instance, a paste-like manner.

In filling the reinforcing filler 21, press-fitting or weight filling is performed through an injecting hole 22 piercingly formed at a suitable location on the outer peripheral portion of the steel pipe member 1 to correspond to the space portions 2g of the reinforcing elements 2 welded to the steel pipe member 1 so that the filler is evenly spread into the space portions 2g without generating any clearances or air bubbles.

The injecting hole 22 is formed on either one or a plurality of spots, and depending on conditions of filling of the reinforcing filler 2, injection shall be performed from a plurality of injecting holes 22.

When the reinforcing elements 2 are provided by a number of three or more, the reinforcing element 2 located intermediate is piercingly formed with a flow hole 23 at one or a plurality of spots thereof so as to promote the mobility of the reinforcing filler 21 within the space portions 2g for filling the reinforcing filler 21 to the entire interior of the reinforcing elements 2. The injecting holes 22 may be plugged after completion of filling of the reinforcing filler 21.

Moreover, filling of the reinforcing filler 21 into the steel pipe member 1 may be performed not only to the space portions 2g of the reinforcing elements 2 but the reinforcing filler 21 may also be filled into the entire hollow portion 1a of the steel pipe member 1, and filling of the reinforcing filler 21 shall be suitably and selectively performed depending on the required strength for the steel pipe member 1 or the building; in such an instance, the steel pipe member 1 comprises injecting holes for the reinforcing filler 21 (not illustrated) at suitable portions thereof.

An example of the construct A for buildings according to the present embodiment in which it is used as a pillar element erected such that its longitudinal direction becomes a vertical direction with respect to the horizontal plane when joining pillar elements and beam elements c in a structural steelwork will now be explained with reference to FIGS. 7 to 10.

In the pillar element comprised by the construct A for buildings, a connecting member 30 for joining with an end portion of a beam element c of the building (structural steelwork) is connected through welding and joining 31 to welded and joined portions at which welding and joining 4 of the steel pipe member 1 and the reinforcing elements 2 has been performed.

More particularly, the above pillar element c may be shaped as an H-bar, a T-bar, an angular bar or a circular bar, and when an H-bar is employed as the beam element c as illustrated in FIGS. 7(a) and (b), it is comprised of a vertical web c1 at an intermediate portion and two horizontal (direction orthogonal to the web c1) sides provided upward and downward thereof, namely an upper flange c2 and a lower flange c3.

The connecting member 30 is comprised of a vertical web 30a at an intermediate portion and two horizontal (direction orthogonal to the web 30a) sides provided upward and downward thereof, namely an upper flange 30b and a lower flange 30c.

More particularly, an end surface of the connecting member 30 is abutted with respect to the steel pipe member 1 to positions at which the reinforcing elements 2 have been welded (portions of welding and joining 4) for performing welding and joining 31 between the portions of the welding and joining 4 and the connecting member 30.

Figure 7:
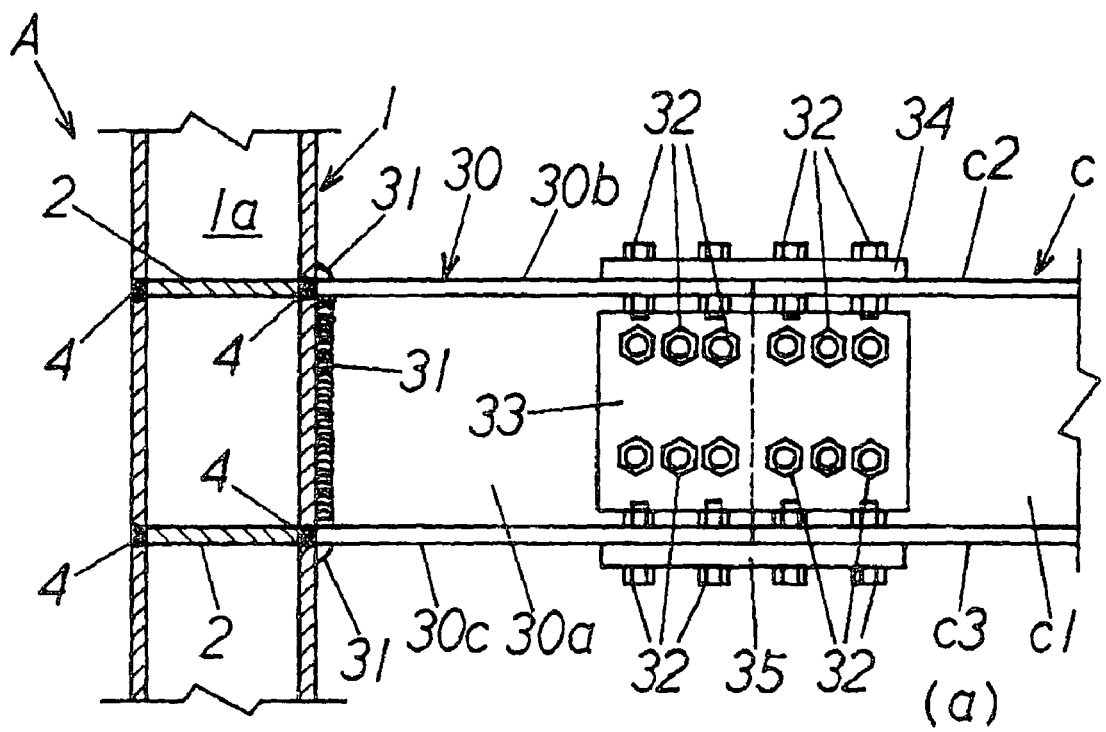
FIG. 7 illustrates conditions in which the construct for buildings of FIG. 1 is provided with a connecting member that is joined to a beam element, wherein (a) is a front view of a main portion, and (b) is a plan view of the main portion, respectively.
Figure 7:
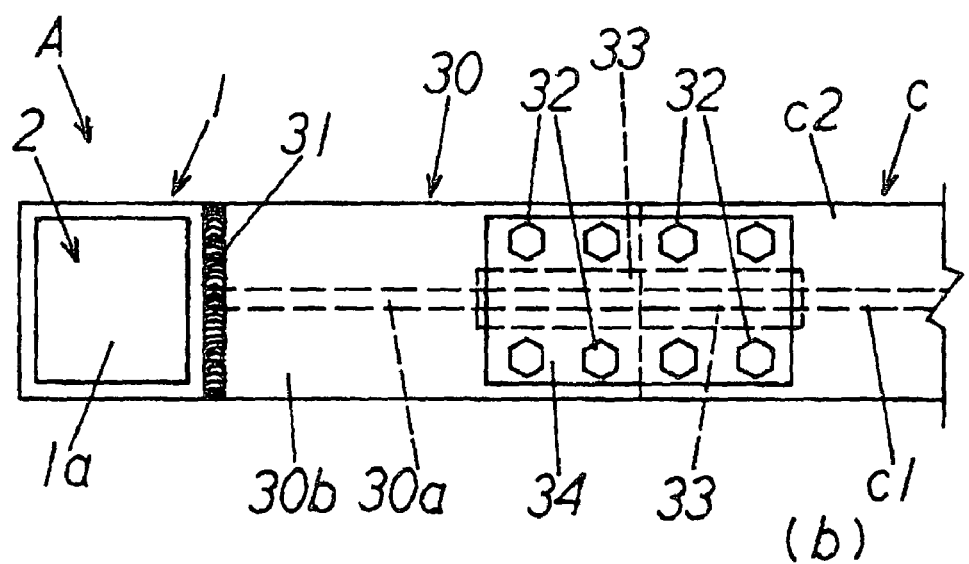

At this time, the end portions of the upper flange 30b and the lower flange 30c of the connecting member 30 correspond to mounting positions of the reinforcing elements 2 preliminarily welded to the steel pipe member 1 in accordance with a height dimension of the connecting member 30 as illustrated in FIG. 7, and they are provided on a substantially same straight line as the mounting positions between the upper flange 30b and the lower flange 30c of the connecting member 30 and the respective reinforcing elements 2 without causing any shifts neither in horizontal directions nor in vertical directions.

Welding and joining 31 is then performed at required spots between the steel pipe member 1 and the connecting member 30 (abutting peripheral edge portions) for fixing the steel pipe member 1 and the connecting member 30.

In the course of the above operations, the process of inserting the reinforcing elements 2 into the steel pipe member 1 for welding the steel pipe member 1 and the reinforcing elements 2 and the process of welding the connecting member 30 are performed in factories or similar places that are favorable in view of workability or safety.

The construct A for buildings thus processed to be formed with the connecting member 30 is then transported to a construction site of a structural steelwork and is then erected at a positioned determined on the basis of a design, and when connecting beam elements c thereto, the beam elements c are fixed by the connecting members 30 and coupling members 32 such as bolts and nuts passing through via holes formed on the beam element c by using the connecting members 30 welded to the steel pipe member 1.

At this time, connecting plates 33, 34, 35 bridging over the beam element c and the connecting member 30 are made to abut against the web c1 of the beam element c and the web 30a of the connecting member 30, the upper flange c2 of the beam element c and the upper flange 30b of the connecting member 30, and the lower flange c3 of the beam element c and the lower flange 30c of the connecting member 30 and are tightly fastened through a plurality of coupling members 32 for fixing the beam element c and the connecting member 30; in this manner, the mounting positions between the upper flange c2 and the lower flange c3 of the beam element c and the respective reinforcing elements 2 are provided on the substantially same straight line without causing any shift in horizontal directions against vertical directions.

It goes without saying that the sectional shape of the beam element c may be, as already discussed, like a T-bar, an angular bar or a circular bar when connecting the pillar element comprised by the construct A for buildings with the beam element c.

Figure 8:
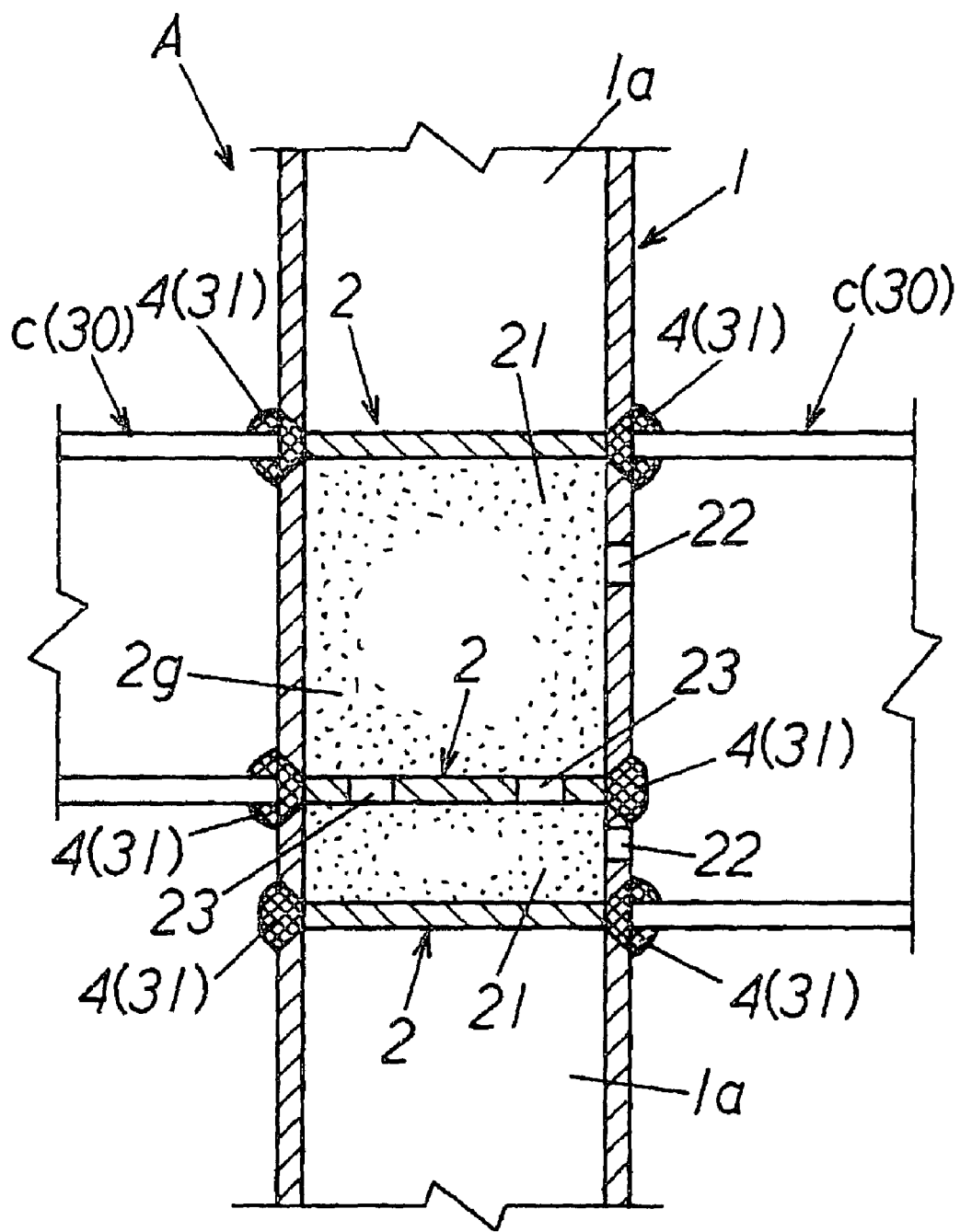

The construct A for buildings employed as the pillar element may be arranged, as illustrated in FIG. 8, in that the space portions 2g formed by the reinforcing elements 2, 2 . . . are filled with the reinforcing filler 21 for further reinforcing the construct A for buildings, wherein the above-described means (see FIG. 6) may be employed as the means for filling.

Figure 9:
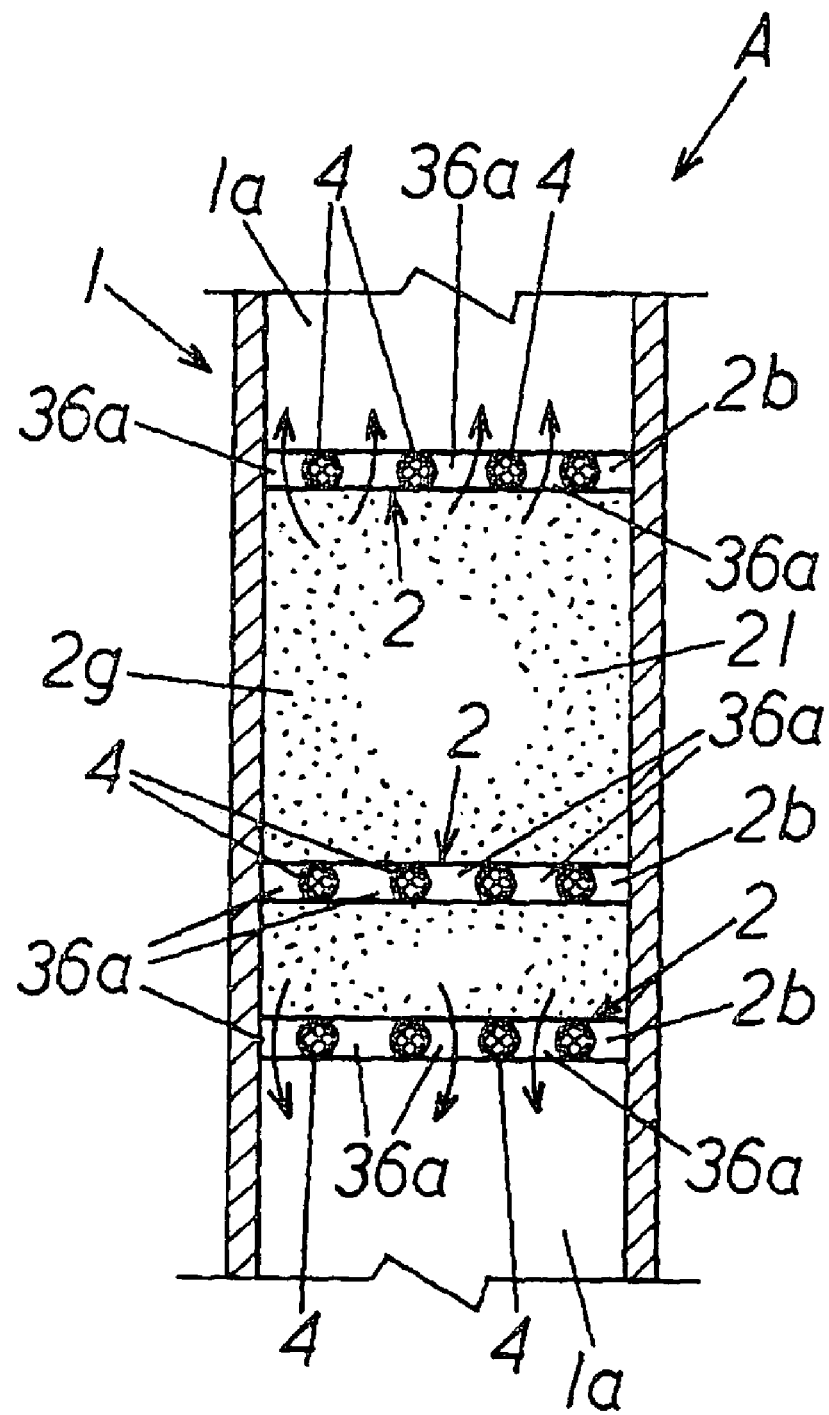
FIG. 9 is a sectional view illustrating a means for releasing evolved gas provided at reinforcing element portions of the construct for buildings of FIG. 1.
Figure 10:
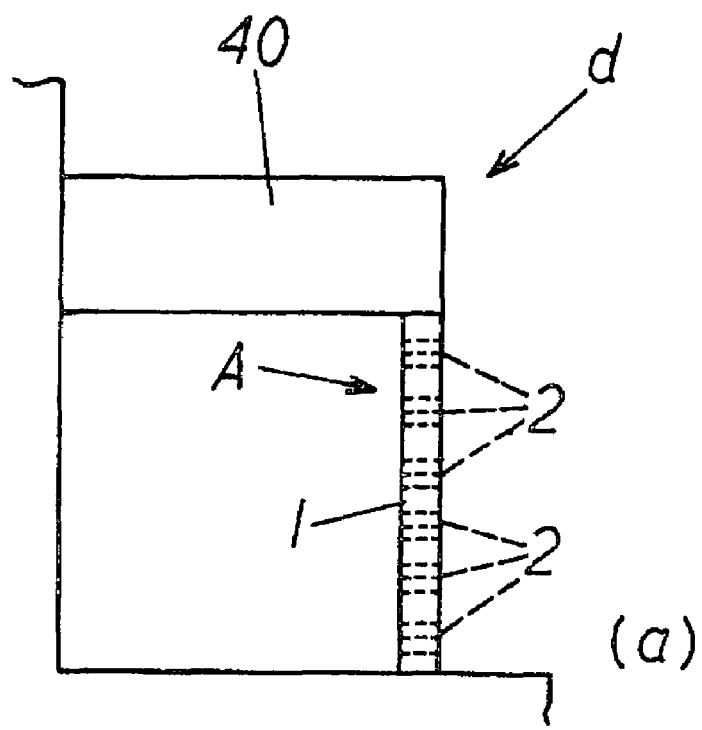
FIG. 10 shows explanatory views illustrating different examples for using the construct for buildings of the present invention, wherein (a) is an example in which it is used as a pillar element, and (b) an example in which it is used as a beam element (bridge etc).
Figure 10:
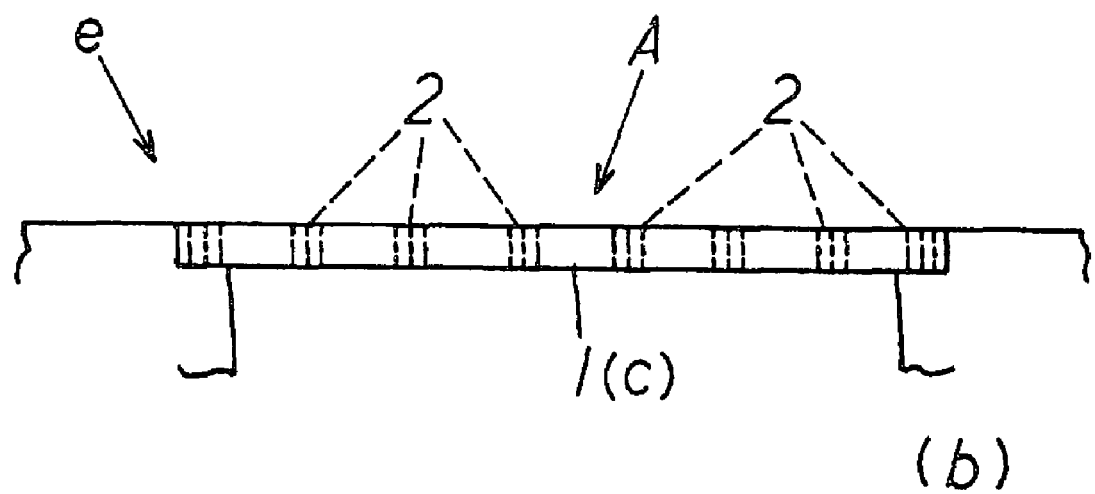

When the reinforcing filler 21 is filled into the space portions 2g of the reinforcing elements 2 in FIG. 9, in the event of a fire disaster and generation of smoke or gas accompanying heating of the steel pipe member 1 or the reinforcing filler 21, such evolved gas may escape through slight clearances 36a formed between adjoining joint holes 3, 3 since welding and fixing of the steel pipe member 1 and the reinforcing elements 2 is performed through the joint holes 3 at specified intervals with respect to the outer peripheral surfaces 2b, 2b, 2b of the reinforcing elements 2 as illustrated in FIG. 9 (illustrated in a manner cut at the welding and joint 4 portions). It is accordingly possible to prevent burst of the reinforcing filler 21 or the space portions 2g owing to increase in pressure in the space portions 2g or expansion of the reinforcing filler 21.

Figure 14:
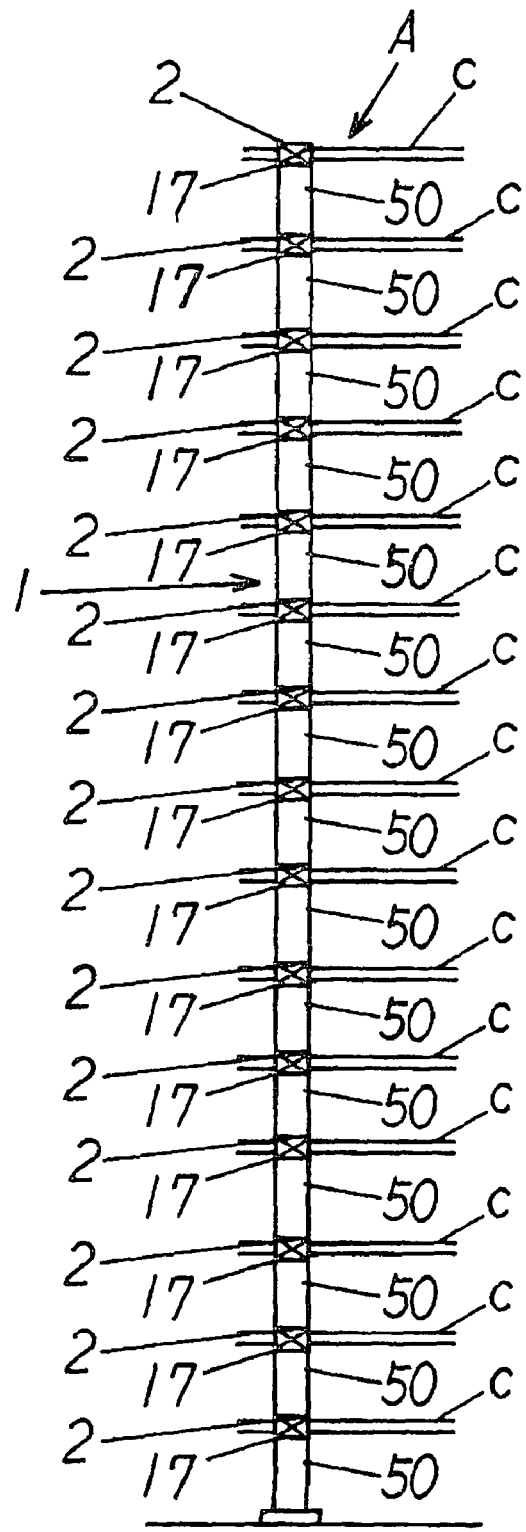
FIG. 14 is an explanatory view illustrating a relationship between reinforcing elements (spots of high rigidity) and hollow portions (spots of low rigidity) of a high-rise building in a joint structure of pillar elements and beam elements constructed by the construct for buildings of FIG. 1.

When filling the reinforcing filler 21 into the space portions 2g of the reinforcing elements 2, by alternately providing spots 17 of high rigidity of the respective reinforcing elements 2, 2, 2 filled with the reinforcing filler 21 and spots 50 of low rigidity (when compared to the spots including the reinforcing element 21) including no reinforcing filler 21 (hollow portion 1a of steel pipe member 1) in the height direction of the steel pipe member 1 as illustrated in FIG. 14, it is possible to exhibit high quake-absorbing effects when used in a high-rise building b or ultra-tall building b.

More particularly, as illustrated in FIG. 14, there are alternatively provided spots 17 at which the reinforcing filler 21 has been filled to the reinforcing elements 2, 2, 2 . . . fitted and welded to the space portion 50 of the steel pipe member 1 (1a (see FIG. 1)) and spots that are not filled with the reinforcing filler 21, that is, spots 50 at which the hollow portion 1a of the steel pipe member 1 is entirely hollow in the space from the lower beam element c to the upper beam element c, and where required, the hollow portions 50 may also be assembled with reinforcing elements 2.

The portions of the reinforcing elements 2 comprise the spots of high rigidity while the spots 50 at which the hollow portion 1a of the steel pipe member 1 is entirely hollow comprise the spots of low rigidity.

With this arrangement, while load applied on the steel pipe member 1 through oscillation generated in the event of an earthquake will apply to both of the spots of high rigidity and spots of low rigidity, the way of quaking of the steel pipe 1 will be varied in their quaking directions through the strong and weak of the rigidity at the spots of high rigidity and spots of low rigidity or the oscillation may be reduced by repeating such phenomena to thereby exhibit quake-absorbing effects.

In such case, it is alternatively possible to refrain from injecting the reinforcing filler 21 with respect to the reinforcing elements 2 to obtain an arrangement in which spots of high rigidity with the reinforcing elements 2 being assembled into the interior of the steel pipe member 1 and spots having a lower rigidity than the spots of high rigidity at which no reinforcing elements 2 are provided in the interior of the steel pipe member 1 are alternately provided.

As already mentioned, the construct A for buildings according to the present embodiment of the invention may be employed as pillar elements serving as vertical materials or beam elements serving as horizontal materials (also including sloped materials), and the building to which it is employed may include, as illustrated in FIG. 10(a), a laterally pendent element 40 of the building d, and for supporting and receiving the vertical load of the pendent element 40, a construct A for buildings in which a plurality of reinforcing elements 2, 2 . . . are mounted into the steel pipe element 1 at specified intervals is employed.

When the construct A for buildings is employed as a beam element c, the beam element c may comprise a bridge of a building e as illustrated in FIG. 10(b).

Figure 11:
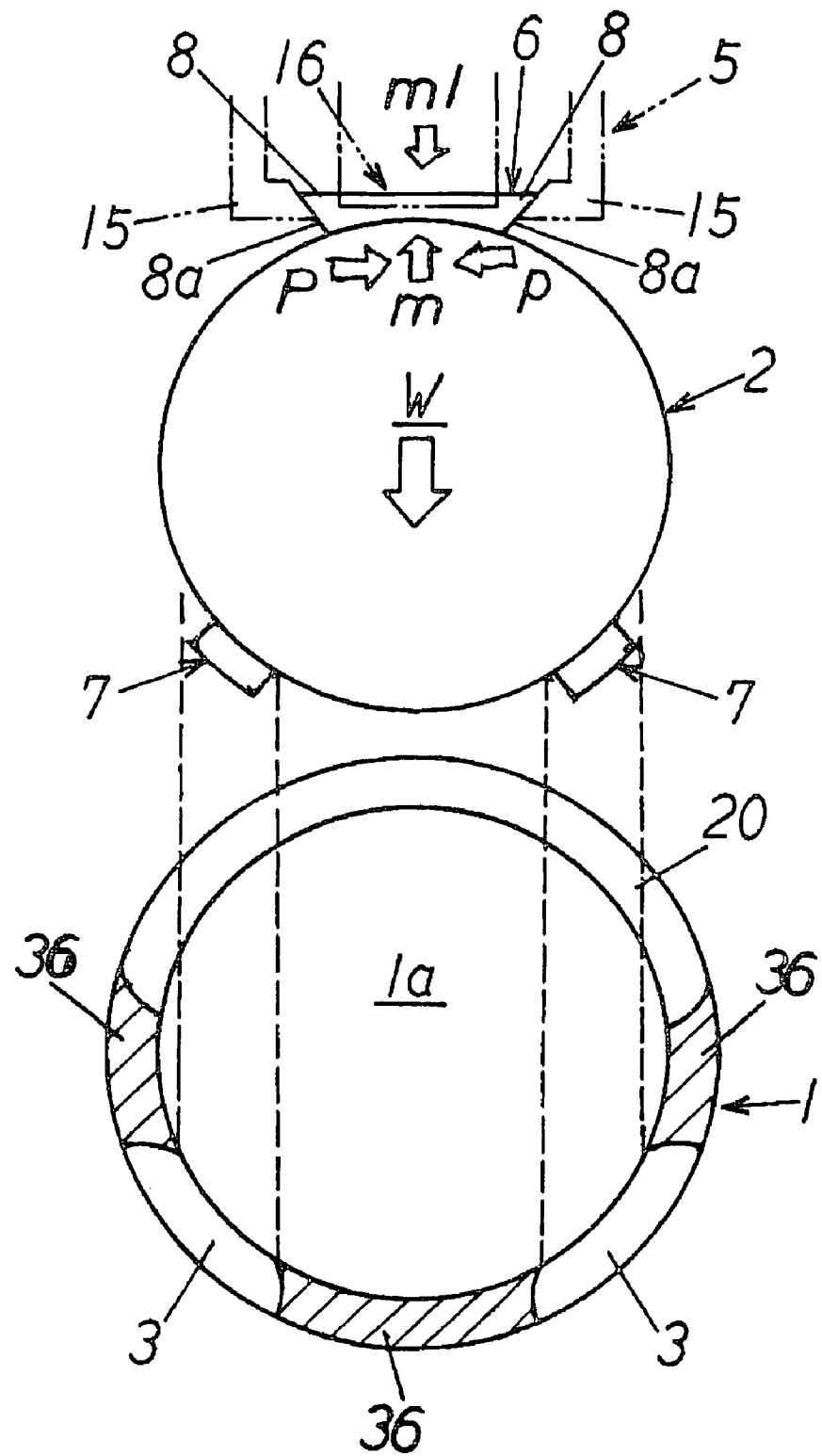
FIG. 11 is an explanatory view illustrating a condition in which the reinforcing elements are inserted into a steel pipe member having a circular section of the construct for buildings of FIG. 1.

FIG. 11 illustrates an example in which a reinforcing element 2 is inserted into the hollow portion 1a of the steel pipe member 1 having a circular section, and in this case, the inserting hole 20 piercingly formed in the steel pipe member 1 needs to have an aperture width that is not less than an internal dimension of the steel pipe member 1.

Figure 12:
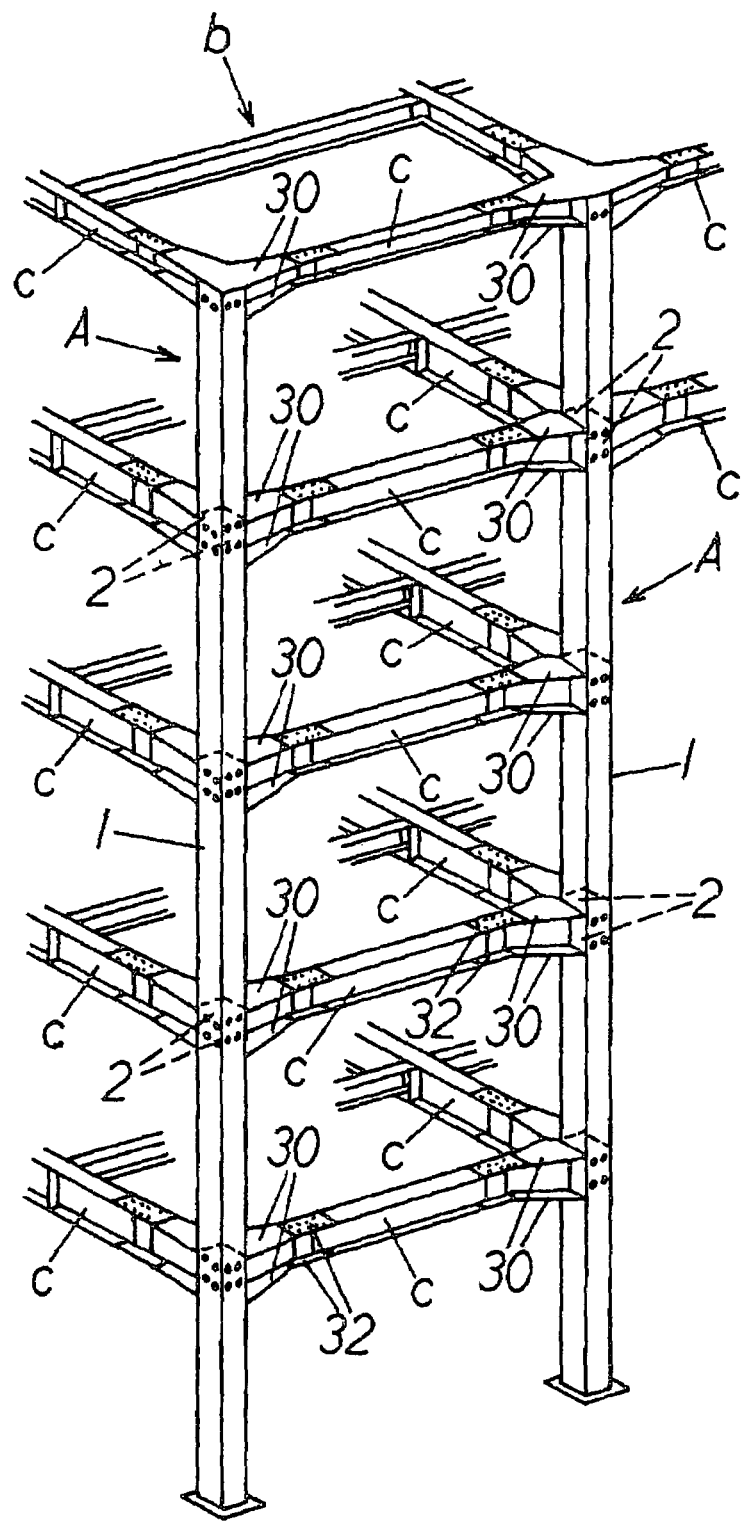
FIG. 12 is a perspective view illustrating a framework constructed by the construct for buildings of FIG. 1.

Particularly in case the construct A for buildings according to the present embodiment of the invention is employed as a pillar element, the successive and single steel pipe member 1 may be employed without separating the same in the middle thereof for shortening purposes in the multi-leveled structural steelwork as illustrated in FIG. 12, and the strength against vertical load or horizontal load can be remarkably increased when compared to a conventional construction method in which pillar elements are connected through diaphragms for each level to thus provide large merits in that the period and costs for construction are reduced and in that the workability is improved.

Figure 16:
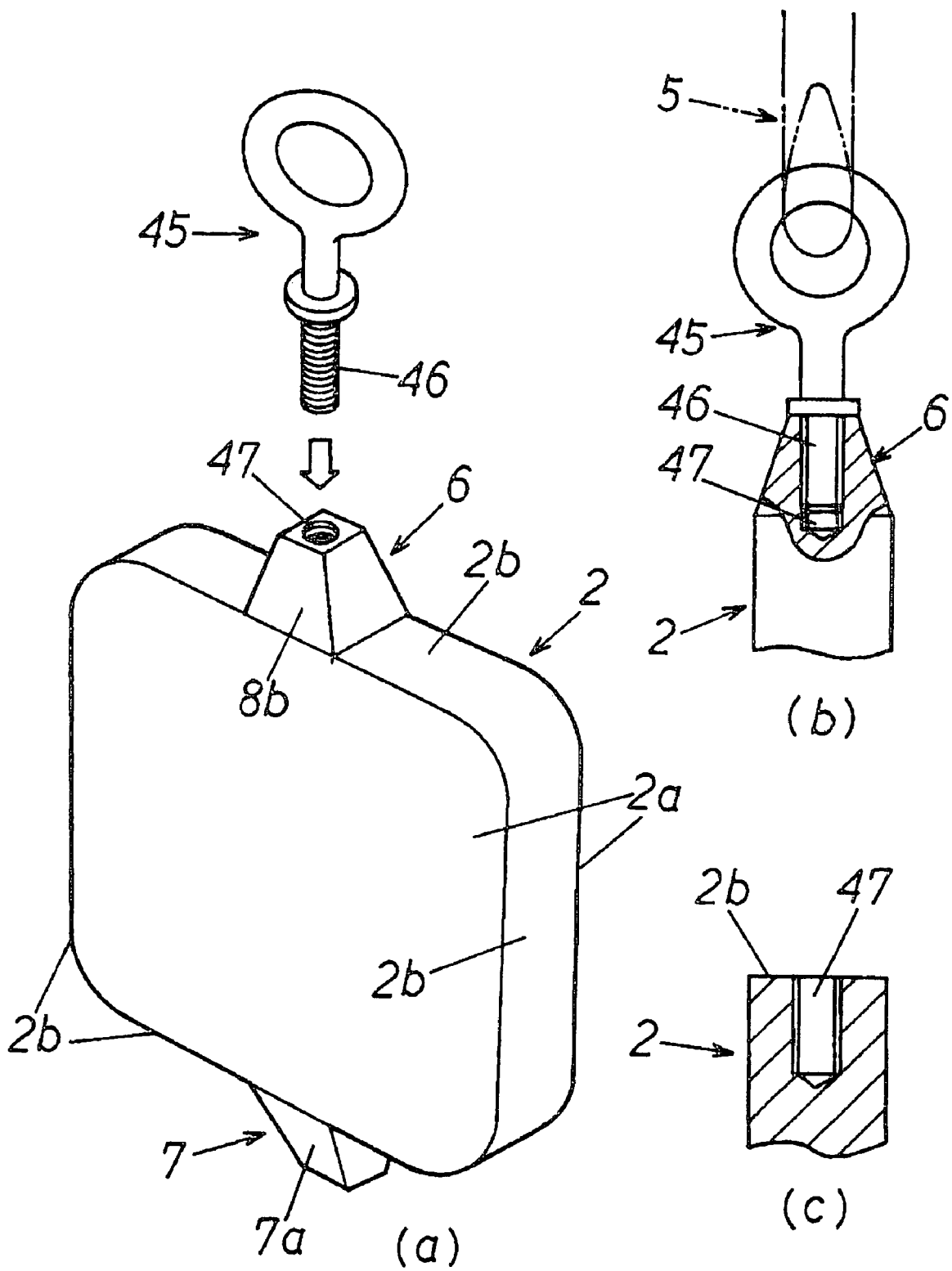
FIG. 16 illustrates other examples of the projecting members of the reinforcing elements employed in the construct for buildings of FIG. 1, wherein (a) is a perspective view, (b) an explanatory view of a main portion of a condition in which a hook element is mounted, and (c) a sectional view of a main portion illustrating another condition for forming a female screw element, respectively.

In FIG. 16, the reinforcing element 2 illustrates another example of an engaging element 6, wherein this engaging element 6 for the reinforcing element 2 is provided at the top of the outer peripheral surface 2b of the reinforcing element 2, and a shape 8b that is sectioned in a direction that is orthogonal to a length direction of the engaging element 6 is formed to be either triangular with its apex facing upward as illustrated in FIG. 3(c), as to be arc-like with its arc surface facing upward as illustrated in FIG. 3(d) or as to be trapezoidal having a top side that is shorter than a bottom side as illustrated in FIG. 3(e) or, though not illustrated, to be rectangular, either cubic or oblong. As further illustrated in FIG. 16(c), it is also possible to provide no sectioned shape 8b at all on the top of the reinforcing element 2.

Though not illustrated, a bottom side of the sectioned shape 8b may be formed to be shorter than a plate thickness of the reinforcing element 2 (for reference purposes, thus shaped as the sectioned shape 7a of the projecting member 7 as illustrated in FIGS. 15(d), (e) and (f)).

Then, as illustrated in FIGS. 16(a) and (b), a female screw element 47 for screwing a male screw element 46 of a hook element 46 that is connected to the suspending means 5 such as a crane or hoist is formed either on the top of the engaging element 6 or directly on the outer peripheral surface 2b as illustrated in FIG. 16(c).

Accordingly, the position of screwing the female screw element 47 to the reinforcing element 2 is defined to be a position with which the suspended posture of the reinforcing element 2 is a balanced one which is facing in a substantially vertical direction when the reinforcing element 2 is suspended by the suspending means 5. The female screw element 47 may alternatively be provided, if required, at a plurality of spots, and in such instance, the number of hook elements 45 screwed to the female screw elements 47 is provided to correspond to the number of the female screw elements 47.

Figure 17:
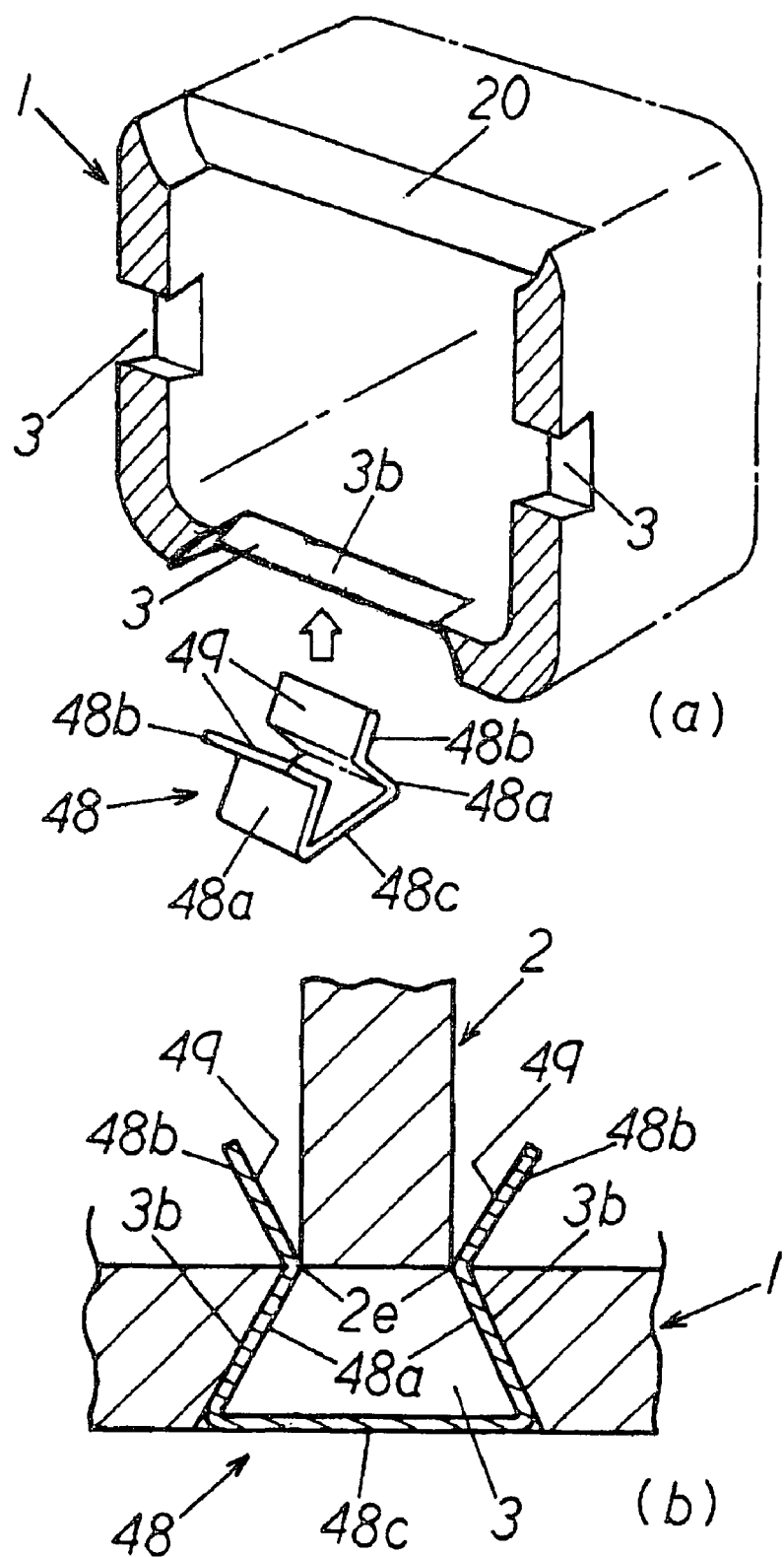
FIG. 17 illustrates a guide element for guiding reinforcing elements of the construct for buildings of FIG. 1, wherein (a) is a perspective view illustrating a condition prior to mounting and (b) a sectional view of a main portion illustrating a condition after mounting, respectively.

In FIGS. 17(a) and (b), 48 denotes a guiding element that is fitted into the lower joint holes 3 piercingly formed on the outer peripheral portion of the steel pipe member 1 for properly guiding correspondence of the reinforcing elements 2 to the lower joint holes 3 when inserting the reinforcing elements 2 from the upper inserting holes 20 piercingly formed on the peripheral surface of the steel pipe member 1. When using such a guiding element 48, it is not necessary required to form the projecting members 7 at lower portions of the outer peripheral surfaces 2b of the reinforcing elements 2 so that the outer peripheral surfaces 2b of the reinforcing elements 2 will be flat.

As illustrated in FIGS. 17(a) and (b), the guiding element 48 includes stopping elements 48a, 48a abutting against inner wall surfaces 3b, 3b of the joint hole 3 and guide members 48b, 48b provided to extend from one end portions (inner end portion sides) of the stopping elements 48a, 48a for jutting into the hollow portion 1a of the steel pipe element 1, and the other end portions (outer end portion sides) of the stopping elements 48a, 48a are connected through a bonding member 48c while the guide members 48b, 48b on the opposite side of the bonding member 48c are capable of moving inward.

The guiding members 48b, 48b are provided with downwardly sloped surfaces 49 that expand to both side with respect to the length direction of the steel pipe member 1 with the joint hole 3 being pinched between and along which lower end edge portions 2e, 2e of the outer peripheral surface 2b of the reinforcing element 2 may abut and slide.

It should be noted that when the guiding element 48 is formed of a material that exhibits elasticity, for instance, a material with spring properties, mounting and temporal fastening to the joint holes 3 might be favorably performed. Moreover, the guiding elements 48 may also be detached from the joint holes 3 after inserting the reinforcing elements 2 into the steel pipe element 1. When the guiding elements are formed of a fusing material and no drawbacks are presented in view of theory of structure or strength of the construct A for buildings, the guiding elements 48 may be integrally fused together when performing welding and joining 4 of the steel pipe member 1 and the reinforcing elements 2 at the joint holes 3.

Figure 18:
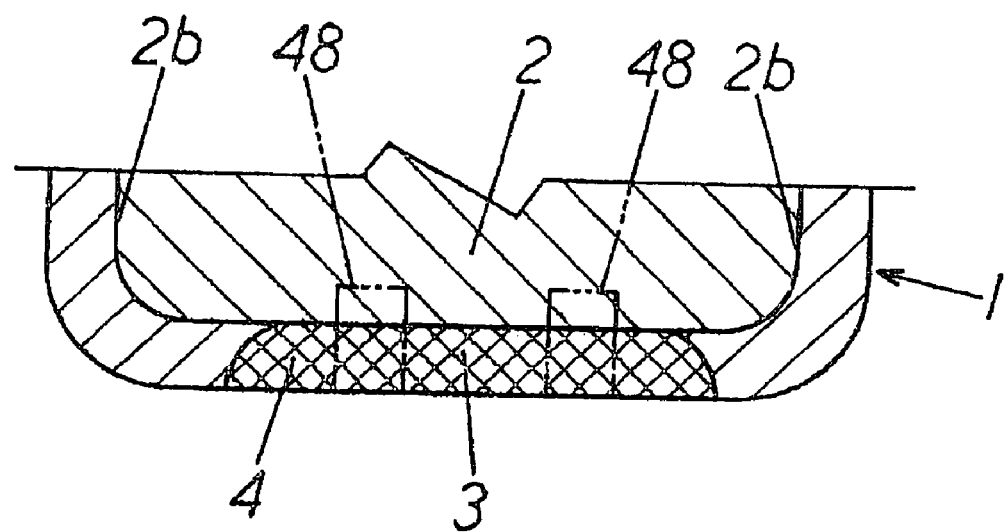
FIG. 18 is a sectional view of a main portion illustrating a condition with two guide elements for guiding the reinforcing elements of the construct for buildings of FIG. 17 being mounted.

The guiding elements 48 may be formed by a plurality of numbers at specified intervals with respect to the length direction of the joint hole 3 formed in the steel pipe element 1 as illustrated in FIG. 18, and the number to be used shall be arbitrarily selected.

While a suitable entire width dimension for the guiding element 48 is approximately ⅓ of a dimension of the joint hole 3 in the length direction, the dimension may be arbitrarily selected.

For forming the construct A for buildings by using the guiding element 48, the reinforcing element 2 is inserted through the inserting hole 20 located at an upper portion of the steel pipe member 1 with the length direction of the steel pipe member 1 being laid lateral towards the hollow portion 1a thereof, the reinforcing element 2 descends vertically into the hollow portion 1a via the suspending means 5 and the hook element 45 through vertical maintaining actions of the own weight of the reinforcing element 2 itself.

The reinforcing element 2 properly corresponds to the joint hole 3 piercingly formed at a lower portion of the steel pipe member 1. If the maintained posture of the reinforcing element 2 suspended by the suspending means 5 should not be a vertical condition, that is, when the lower portion of the reinforcing element 2 is somewhat shifted from the position of the joint hole 3 in either lateral direction, the lower end edge portions 2e, 2e of the outer peripheral surface 2b of the reinforcing element 2 will abut the sloped surfaces 49 of the guide members 48b, 48b of the guiding element 48 so that the lower end edge portions 2e, 2e will slide along the sloped surfaces 49 together with the descending of the reinforcing element 2 to be introduced to the joint hole 3 side so that the maintained posture of the reinforcing element 2 will be corrected to a proper vertical directional position to accurately correspond to the joint hole 3, and the reinforcing element 2 is accordingly inserted properly into the hollow portion 1a of the steel pipe member 1.

In this condition, when welding and joining 4 is performed at the joint holes 3, 3, 3 and the inserting holes 20, the steel pipe member 1 and the reinforcing elements 2 may be welded and fused to become integral.

As discussed so far, according to the present invention, mounting of the reinforcing elements to the hollow portion of the steel pipe member may be performed accurately and reliably, and this in a simple manner by merely forming joint holes and inserting holes at arbitrary positions of the outer peripheral portion of the steel pipe member.

Since the maintained posture of the reinforcing elements is particularly positioned continuously in the vertical direction since they are suspended by the suspending means, insertion into the inserting holes may be reliably performed and the posture of the reinforcing elements will not move rashly during insertion thereof.

What is claimed is:

1. A construct for buildings comprising an elongated steel pipe member with a hollow interior and reinforcing elements provided in a hollow portion of the interior of the steel pipe member to cross the interior of the steel pipe member in a longitudinal direction, said steel pipe member and said reinforcing elements being welded and joined together at a plurality of joint holes piercingly formed on an outer peripheral portion of said steel pipe member, wherein said steel pipe member is formed with inserting holes for the reinforcing elements on the outer peripheral portion of the steel pipe member formed at mounting positions for said reinforcing elements to be of a width that meets a width dimension of the reinforcing elements, wherein these inserting holes are provided to be successive from the outer peripheral surface of said steel pipe member to said interior, wherein said reinforcing elements are inserted into said inserting holes from the outer peripheral surface of said steel pipe member towards a direction facing the interior of said steel pipe member in a direction that is substantially orthogonal to the longitudinal direction of the steel pipe member, wherein said reinforcing elements are formed to be plate-like, to have side surfaces that are smaller than cross sections crossing the hollow portion in the interior of said steel pipe member, and to have an outer peripheral surface that is substantially orthogonal to the side surfaces and that corresponds to an inner wall surface of the steel pipe member, wherein an engaging element for engaging with suspending means is provided on one side portion of said peripheral surface, wherein the engaging elements of said reinforcing elements are provided to be parallel to the longitudinal direction of the outer peripheral surface of the reinforcing elements, wherein engaging members for engaging engaging elements of the suspending means are respectively provided on both side portions in the longitudinal direction, wherein the engaging members comprise sloped surfaces that arise from above the outer peripheral surface of said reinforcing element and that respectively become broader in both outer directions in the longitudinal direction of the outer peripheral surfaces of said reinforcing element, and wherein a shape that sections in a direction orthogonal to the longitudinal direction of the reinforcing element is formed on an upper portion of said engaging element to be triangular, arc-like or quadrangular.

2. A construct for buildings comprising an elongated steel pipe member with a hollow interior and reinforcing elements provided in a hollow portion of the interior of the steel pipe member to cross the interior of the steel pipe member in a longitudinal direction, said steel pipe member and said reinforcing elements being welded and joined together at a plurality of joint holes piercingly formed on an outer peripheral portion of said steel pipe member, wherein said steel pipe member is formed with inserting holes for the reinforcing elements on the outer peripheral portion of the steel pipe member formed at mounting positions for said reinforcing elements to be of a width that meets a width dimension of the reinforcing elements, wherein these inserting holes are provided to be successive from the outer peripheral surface of said steel pipe member to said interior, wherein said reinforcing elements are inserted into the inserting holes from the outer peripheral surface of said steel pipe member towards a direction facing the interior of the steel pipe member in a direction that is substantially orthogonal to the longitudinal direction of the steel pipe member, wherein said reinforcing elements are formed to be plate-like, to have side surfaces that are smaller than cross sections crossing the hollow portion in the interior of the steel pipe member, and to have an outer peripheral surface that is substantially orthogonal to the side surfaces and that corresponds to an inner wall surface of said steel pipe member, wherein an engaging element for engaging with suspending means that suspends the reinforcing elements is provided on one side portion of said outer peripheral surface, wherein projecting members corresponding to the joint holes piercingly formed on the outer peripheral portion of said steel pipe member are formed on the outer peripheral surface of said reinforcing element on a side opposite to the engaging element, wherein the engaging elements of the reinforcing elements are provided to be parallel to the longitudinal direction of the outer peripheral surfaces of the reinforcing elements, wherein engaging members for engaging engaging elements of the suspending means are respectively provided on both side portions in the longitudinal direction, wherein the engaging members comprise sloped surfaces that arise from above the outer peripheral surface of said reinforcing element and that respectively become broader in both outer directions in the longitudinal direction of the outer peripheral surface of said reinforcing element, and wherein a shape that sections in a direction orthogonal to the longitudinal direction of the reinforcing element is formed on an upper portion of said engaging element to be triangular, arc-like or quadrangular.

3. A construct for buildings comprising an elongated steel pipe member with a hollow interior and reinforcing elements provided in a hollow portion of the interior of the steel pipe member to cross the interior of the steel pipe member in a longitudinal direction, said steel pipe member and said reinforcing elements being welded and joined together at a plurality of joint holes piercingly formed on an outer peripheral portion of said steel pipe member, wherein said steel pipe member is formed with inserting holes for the reinforcing elements on the outer peripheral portion of the steel pipe member formed at mounting positions for said reinforcing elements to be of a width that meets a width dimension of the reinforcing elements, wherein these inserting holes are provided to be successive from the outer peripheral surface of said steel pipe member to said interior, wherein said reinforcing elements are inserted into said inserting holes from the outer peripheral surface of said steel pipe member towards a direction facing the interior of said steel pipe member in a direction that is substantially orthogonal to the longitudinal direction of the steel pipe member, wherein guiding elements are prepared separately and provided in underneath joint holes piercingly formed on the outer peripheral portion of said steel pipe member, wherein each of the guiding elements comprises stopping members that abut inner walls of said joint hole and guide members that extend from the stopping members and that jut into a space portion of said steel pipe member, and wherein the guide members comprise sloped surfaces that expand to both sides with respect to a length direction of said steel pipe member with said joint holes so that a lower end edge portion of the reinforcing element enters.

4. The construct for buildings as claimed in claim 1, wherein a plurality of reinforcing elements is provided in the interior of the steel pipe member at intervals with a reinforcing filler that solidifies after injection, said filler being filled in a space portion formed between the reinforcing elements.

5. The construct for buildings as claimed in claim 1, wherein the steel pipe member provided with the reinforcing elements in its interior is either a pillar element erected such that its longitudinal direction becomes a direction vertical to a horizontal surface or a beam element that becomes either horizontal or oblique when mounted to a building.

6. The construct for buildings as claimed in claim 1, wherein the steel pipe member provided with the reinforcing elements in its interior is a pillar element erected such that its longitudinal direction becomes a direction vertical to a horizontal surface, and wherein connecting members to be joined with end portions of beam elements of a building are welded and joined to welded joint areas at which said steel pipe member and said reinforcing elements are welded and joined.

7. A method for manufacturing a construct for buildings, wherein in a construct for buildings comprising an elongated steel pipe member with a hollow interior and reinforcing elements provided in a hollow portion of the interior of the steel pipe member to cross the interior of the steel pipe member in a longitudinal direction, said steel pipe member and said reinforcing elements are welded and joined together at a plurality of joint holes piercingly formed on an outer peripheral portion of said steel pipe member, wherein inserting holes are piercingly formed at mounting positions for said reinforcing elements on the outer peripheral portion of said steel pipe member and the steel pipe member is mounted in a substantially horizontal manner such that said inserting holes face upward, wherein engaging elements formed on upper portions of the reinforcing elements are suspended by a suspending means above the inserting holes such that outer peripheral portions that comprise width directions of the reinforcing elements face downward, the reinforcing elements being descended into the inserting holes by dropping the same in a vertical manner through own weight of the reinforcing members and inserted in a direction substantially orthogonal to the longitudinal direction of the steel pipe member from the outer peripheral surface of said steel pipe member towards the interior of said steel pipe member, wherein downside outer peripheral surfaces of said reinforcing elements are supported and received by a lower inner surface of the hollow portion of said steel pipe member such that the outer peripheral surfaces on both side portions of the reinforcing elements correspond to inner side surfaces of the hollow portion of the steel pipe member, and wherein said steel pipe member and the outer peripheral portions of said reinforcing elements are welded and joined to become integral at the inserting holes and said plurality of joint holes.

8. A method for manufacturing the construct for buildings as claimed in claim 7, wherein in suspending the reinforcing elements through the suspending means, engaging elements for the reinforcing elements are provided to be parallel to the longitudinal direction of outer peripheral surfaces of the reinforcing elements; wherein engaging members for engaging with the suspending means are provided on both side portions of the longitudinal direction; the engaging members comprise sloped surfaces that arise from above the outer peripheral surfaces of said reinforcing elements and that respectively become broader in both outer directions in the longitudinal direction of the outer peripheral surfaces of said reinforcing elements, and wherein a shape that sections in a direction orthogonal to the longitudinal direction of said reinforcing element is formed on an upper portion of said engaging elements to be triangular, arc-like or quadrangular, wherein projecting members corresponding to joint holes piercingly formed on the outer peripheral portion of the steel pipe member are provided at lower portions of the engaging elements of said reinforcing elements, the projecting members being formed such that a shape that sections in a direction orthogonal to the longitudinal direction of said reinforcing element is formed to be triangular, arc-like or quadrangular, wherein when the engaging members of the engaging elements of said reinforcing elements are grasped by said suspending means, said reinforcing elements are lifted upward by their sloped surfaces and wherein the reinforcing elements are supported and received in vertical conditions with upper portions of the engaging elements engaging with pressing members of said suspending means for receiving compressive load, and wherein when the projecting members of said reinforcing elements are positioned at the joint holes, outside surfaces of the projecting members formed to be triangular, arc-like or quadratic are guided while abutting peripheral edges of said joint holes to be inserted therein while correcting postures of the reinforcing elements in vertical directions.

* * * * *